US012265061B2

United States Patent
Monde et al.

(10) Patent No.: US 12,265,061 B2
(45) Date of Patent: Apr. 1, 2025

(54) RECORDING MATERIAL DETECTION DEVICE, IMAGE FORMING APPARATUS, AND ULTRASONIC EMISSION DEVICE

(71) Applicant: CANON KABUSHIKI KAISHA, Tokyo (JP)

(72) Inventors: Masafumi Monde, Kanagawa (JP); Junya Azami, Shizuoka (JP); Hiromitsu Kumada, Shizuoka (JP); Ryuichi Araki, Chiba (JP); Mayumi Sakai, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 17/547,082

(22) Filed: Dec. 9, 2021

(65) Prior Publication Data
US 2022/0196605 A1  Jun. 23, 2022

(30) Foreign Application Priority Data

Dec. 18, 2020  (JP) .................................. 2020-210444
Dec. 18, 2020  (JP) .................................. 2020-210445

(51) Int. Cl.
*G01N 29/11*  (2006.01)
*G01B 17/02*  (2006.01)
*G01N 29/36*  (2006.01)

(52) U.S. Cl.
CPC ............. *G01N 29/11* (2013.01); *G01B 17/02* (2013.01); *G01N 29/36* (2013.01)

(58) Field of Classification Search
CPC ...... G01N 29/11; G01N 29/36; G01N 29/032; G01N 29/4436; G01N 29/346;
(Continued)

(56) References Cited

U.S. PATENT DOCUMENTS 5,675,554 A * 10/1997 Cole ................... G01S 7/52019
367/138
9,921,532 B2 * 3/2018 Watanabe .......... G03G 15/5029
2015/0177663 A1 * 6/2015 Namiki .............. G03G 15/6594
73/632

FOREIGN PATENT DOCUMENTS

JP  2004107030 A  4/2004
JP  2004219856 A  8/2004
(Continued)

*Primary Examiner* — Suman K Nath
(74) *Attorney, Agent, or Firm* — Canon U.S.A., Inc. IP Division

(57) ABSTRACT

A device includes a sensor including an emission unit which emits ultrasonic waves and a reception unit which receives the ultrasonic waves, the emission unit and the reception unit being arranged opposite each other across a conveyance path through which a recording material is conveyed, an instruction unit which supplies, to the emission unit, a first drive input or a second drive input larger than the first drive input, and a detection unit which detects information about a grammage of the recording material based on a first value obtained by the reception unit receiving ultrasonic waves emitted from the emission unit with the first drive input supplied thereto and coming not through the recording material and a second value obtained by the reception unit receiving ultrasonic waves emitted from the emission unit with the second drive input supplied thereto and coming through the recording material.

13 Claims, 23 Drawing Sheets

(58) Field of Classification Search
CPC .. G01N 29/04; G01N 29/34; G01N 2291/014; G01N 2291/015; G01N 2291/048; G01N 2291/102; G01B 17/02; G01G 9/00; G03G 15/5029
See application file for complete search history.

(56) References Cited

FOREIGN PATENT DOCUMENTS

| | | | |
|---|---|---|---|
| JP | 2009280324 | A | 12/2009 |
| JP | 2012188177 | A | 10/2012 |
| JP | 2013217926 | A | 10/2013 |
| JP | 2015135321 | A | 7/2015 |
| JP | 2020100490 | A | 7/2020 |

\* cited by examiner

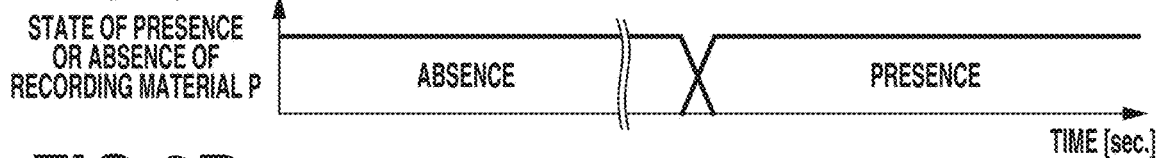
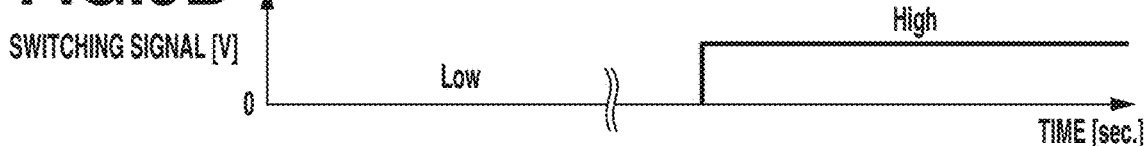
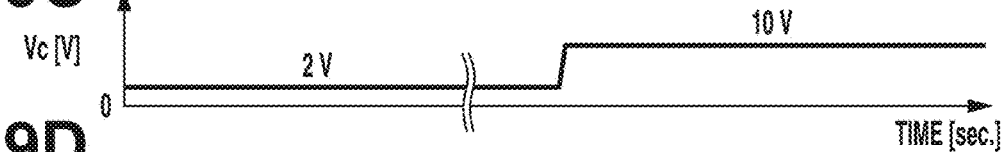
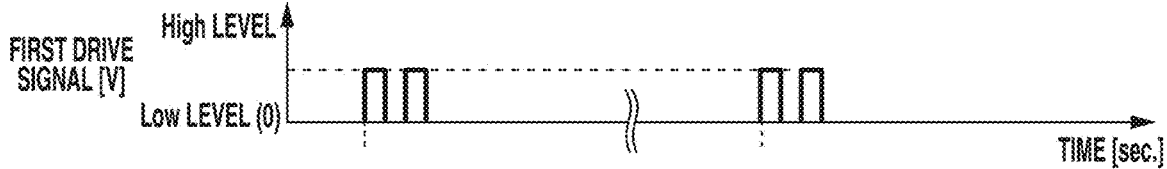
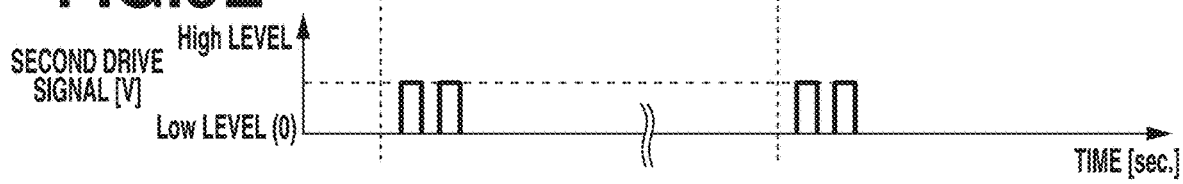
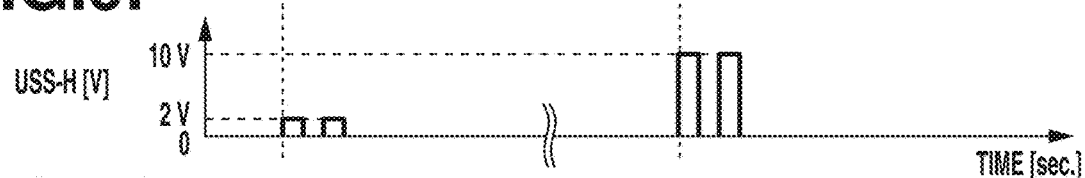
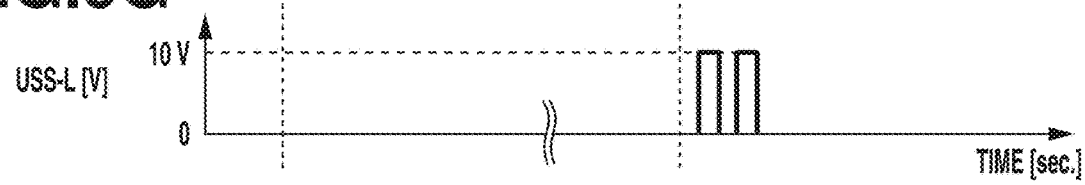
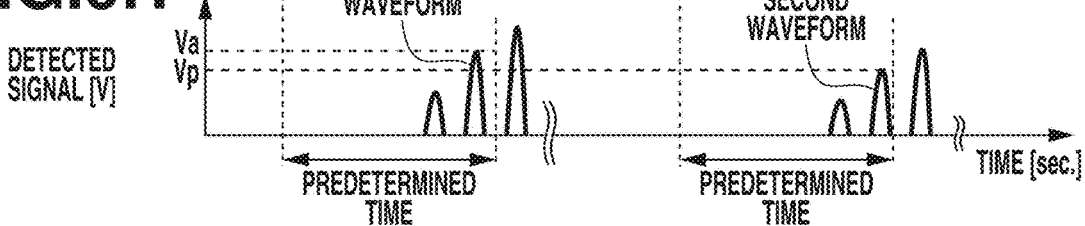

FIG.10A

| OUTPUT OF EMISSION CIRCUIT UNIT 28 | PRESENCE OR ABSENCE OF RECORDING MATERIAL P | RECEIVED SIGNAL | DETECTED SIGNAL | NOISE-TO-SIGNAL RATIO |
|---|---|---|---|---|
| OUTPUT OF FIRST OUTPUT CIRCUIT UNIT / OUTPUT OF SECOND OUTPUT CIRCUIT UNIT (2 V) | ABSENCE | [waveform] | AMPLIFICATION RATE OF ONE TIME, Va | SMALL |
| OUTPUT OF FIRST OUTPUT CIRCUIT UNIT / OUTPUT OF SECOND OUTPUT CIRCUIT UNIT (2 V) | PRESENCE | [small waveform] | APPLICATION RATE OF 20 TIMES, Vp | LARGE |

FIG.10B

| OUTPUT OF EMISSION CIRCUIT UNIT 28 | PRESENCE OR ABSENCE OF RECORDING MATERIAL P | RECEIVED SIGNAL | DETECTED SIGNAL | NOISE-TO-SIGNAL RATIO |
|---|---|---|---|---|
| OUTPUT OF FIRST OUTPUT CIRCUIT UNIT / OUTPUT OF SECOND OUTPUT CIRCUIT UNIT (2 V) | ABSENCE | [waveform] | AMPLIFICATION RATE OF ONE TIME, Va | SMALL |
| OUTPUT OF FIRST OUTPUT CIRCUIT UNIT (10 V) / OUTPUT OF SECOND OUTPUT CIRCUIT UNIT (10 V) | PRESENCE | [waveform] | AMPLIFICATION RATE OF ONE TIME, Vp | SMALL |

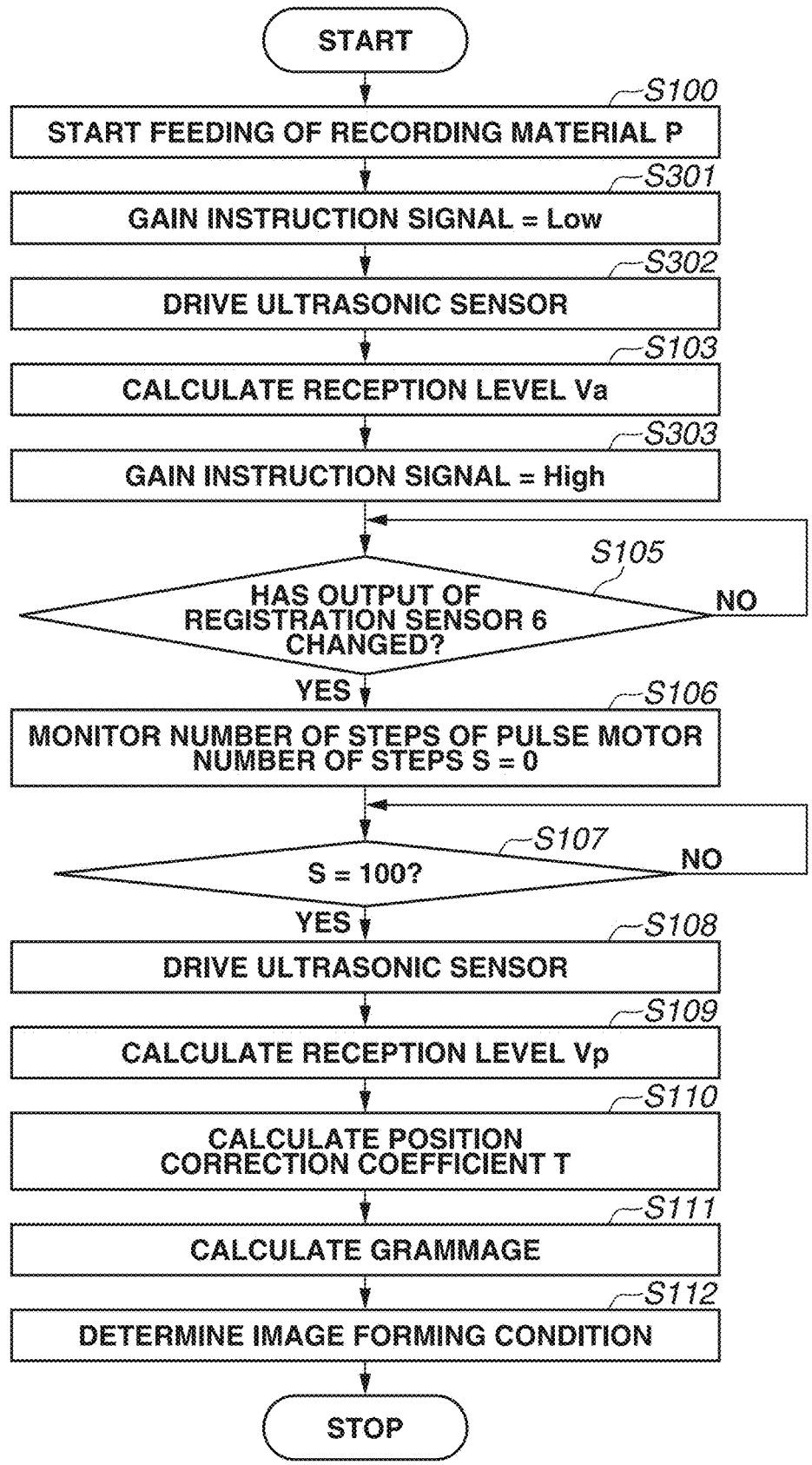

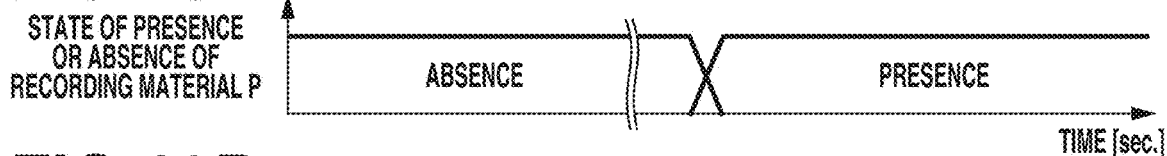
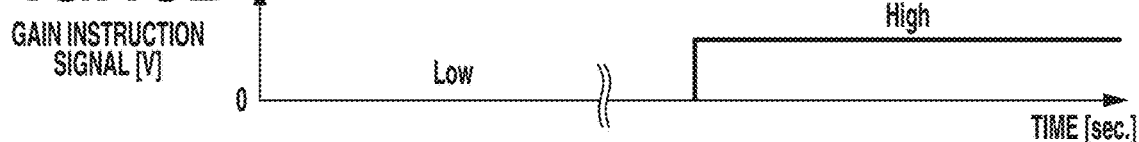
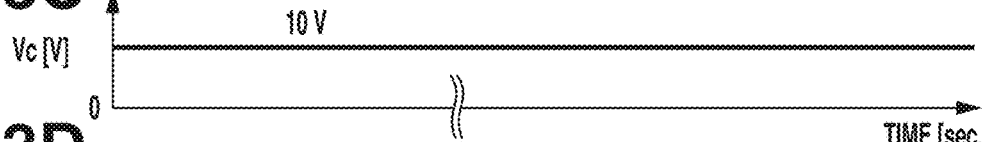
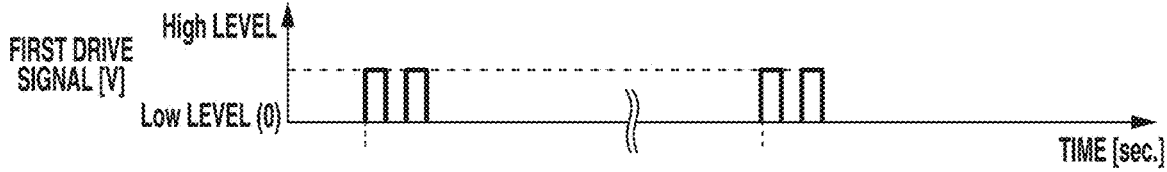
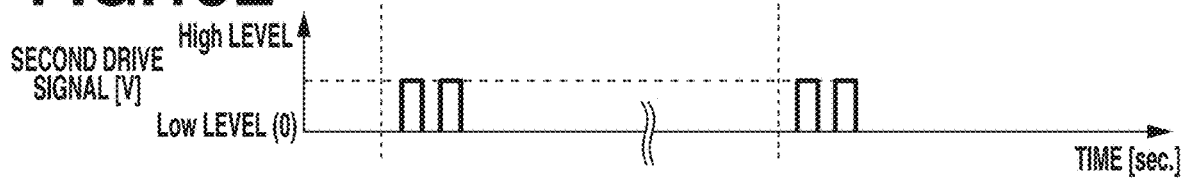
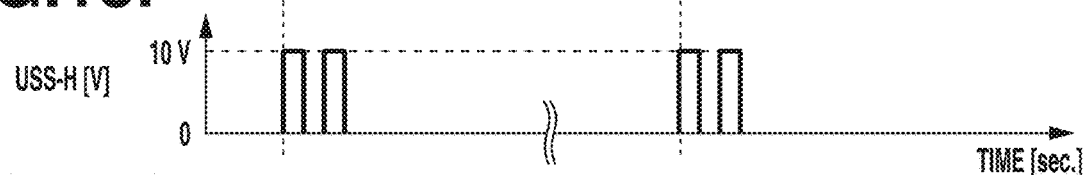
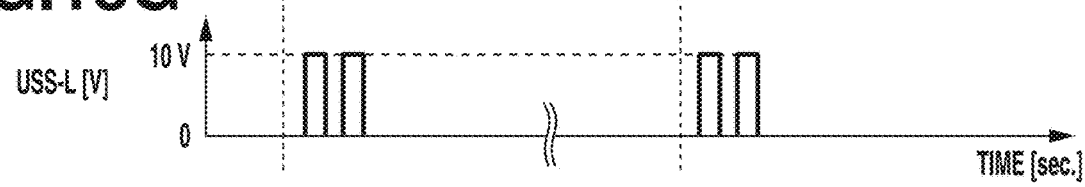
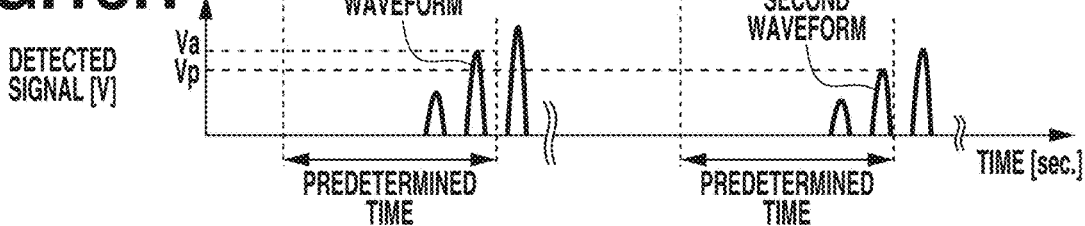

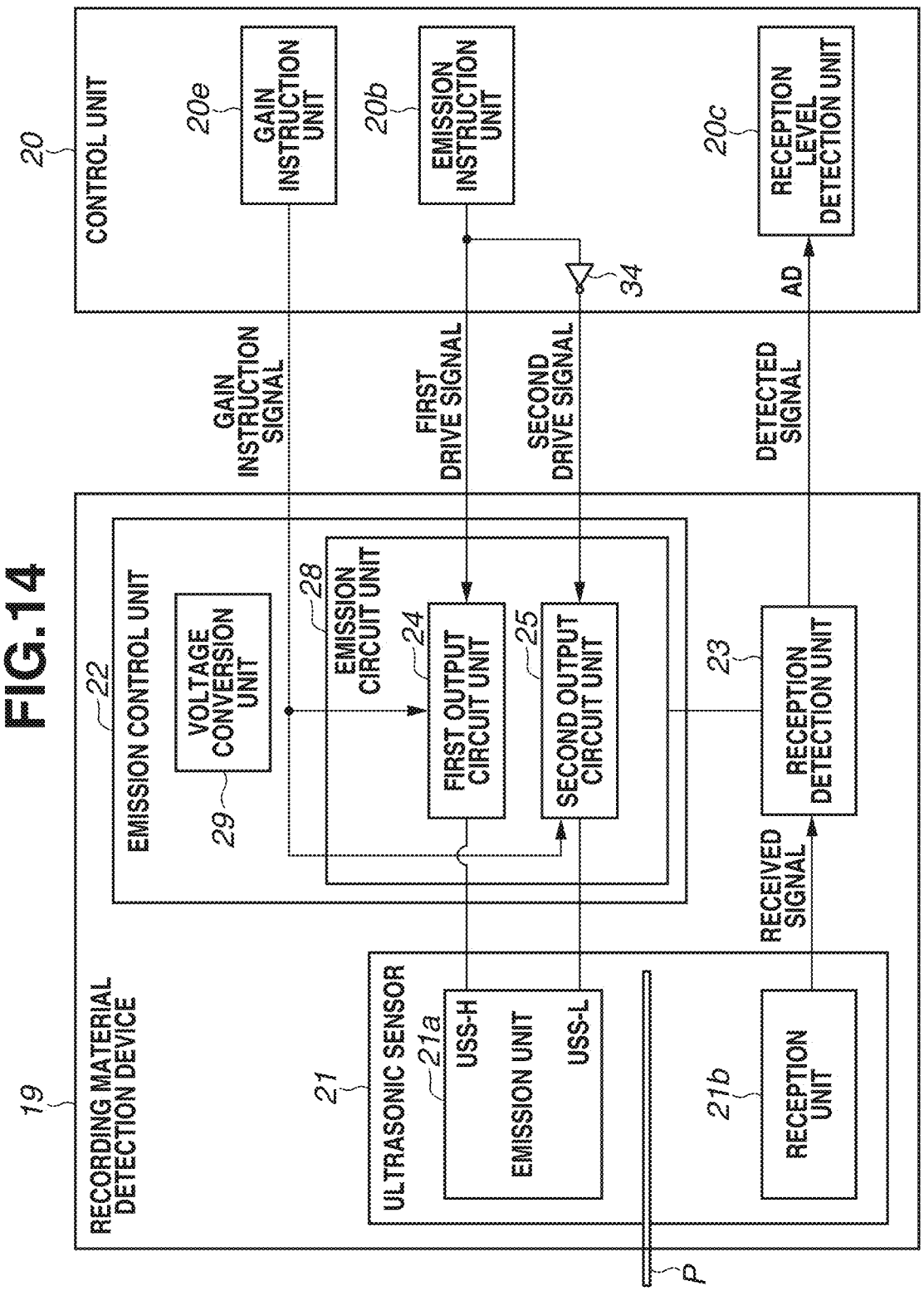

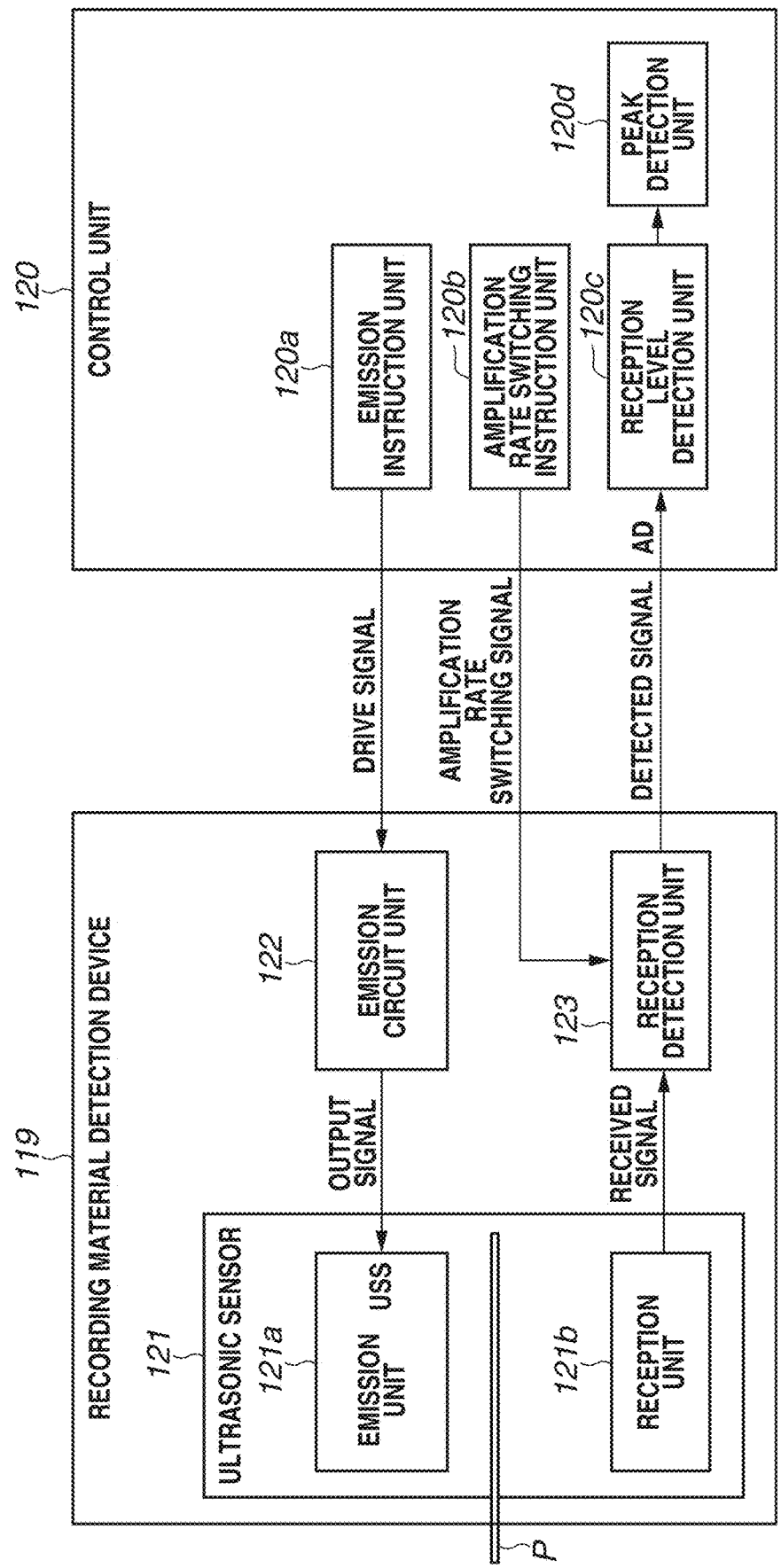

FIG.17A

| OUTPUT SIGNAL | PRESENCE OR ABSENCE OF RECORDING MATERIAL P | PEAK DETECTED SIGNAL | AMPLIFICATION RATE | NOISE-TO-SIGNAL RATIO |
|---|---|---|---|---|
| OUTPUT OF OUTPUT CIRCUIT UNIT — 5 V | ABSENCE | Va3 | ONE TIME | SMALL |
| OUTPUT OF OUTPUT CIRCUIT UNIT — 5 V | PRESENCE | Vp3 | 20 TIMES | LARGE |

FIG.17B

| OUTPUT SIGNAL | PRESENCE OR ABSENCE OF RECORDING MATERIAL P | PEAK DETECTED SIGNAL | AMPLIFICATION RATE | NOISE-TO-SIGNAL RATIO |
|---|---|---|---|---|
| OUTPUT OF OUTPUT CIRCUIT UNIT — 10 V | ABSENCE | Va1 | ONE TIME | SMALL |
| OUTPUT OF OUTPUT CIRCUIT UNIT — 10 V | PRESENCE | Vp3 | 10 TIMES | SMALL |

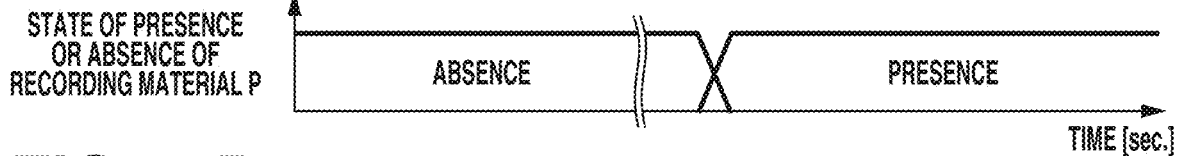
FIG.19A STATE OF PRESENCE OR ABSENCE OF RECORDING MATERIAL P
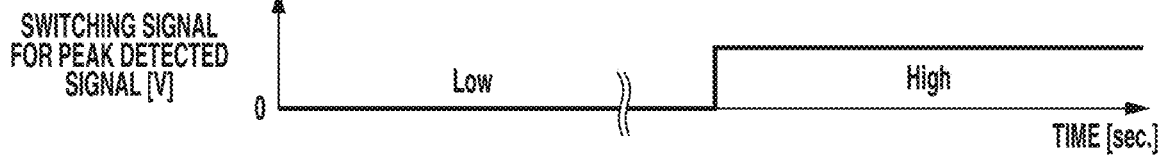
FIG.19B SWITCHING SIGNAL FOR PEAK DETECTED SIGNAL [V]
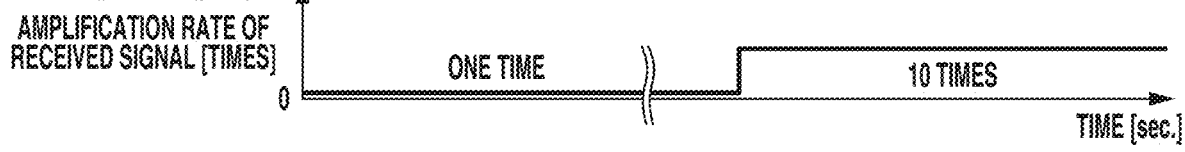
FIG.19C AMPLIFICATION RATE OF RECEIVED SIGNAL [TIMES]
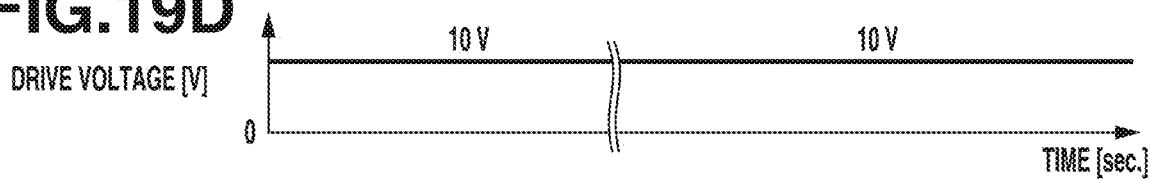
FIG.19D DRIVE VOLTAGE [V]
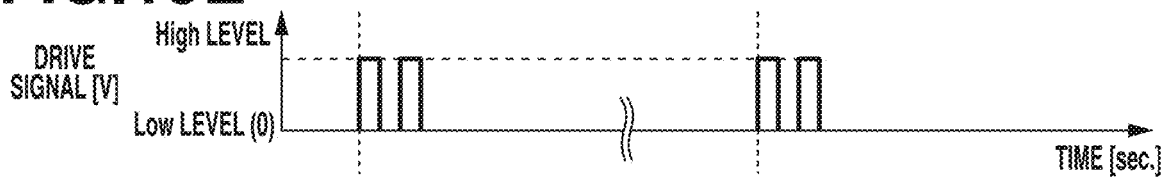
FIG.19E DRIVE SIGNAL [V]
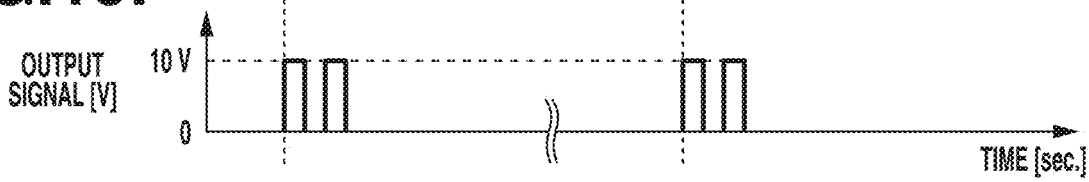
FIG.19F OUTPUT SIGNAL [V]
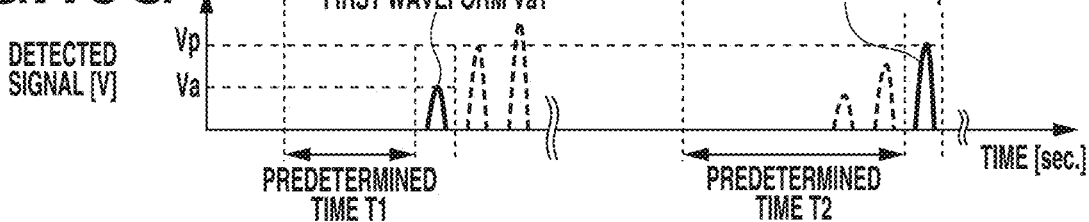
FIG.19G DETECTED SIGNAL [V]

FIG.20

| OUTPUT SIGNAL | PRESENCE OR ABSENCE OF RECORDING MATERIAL P | PEAK DETECTED SIGNAL | AMPLIFICATION RATE | NOISE-TO-SIGNAL RATIO |
|---|---|---|---|---|
| OUTPUT OF OUTPUT CIRCUIT UNIT [V] 10 V [sec.] | ABSENCE | [V] $V_{a1}$ [sec.] | ONE TIME | SMALL |
| OUTPUT OF OUTPUT CIRCUIT UNIT [V] 20 V [sec.] | PRESENCE | [V] $V_{p3}$ [sec.] | FIVE TIMES | SMALL |

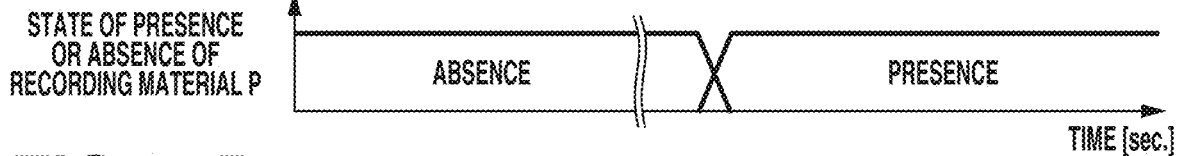
FIG.22A STATE OF PRESENCE OR ABSENCE OF RECORDING MATERIAL P
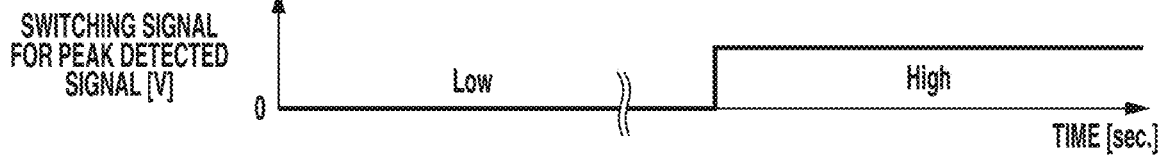
FIG.22B SWITCHING SIGNAL FOR PEAK DETECTED SIGNAL [V]
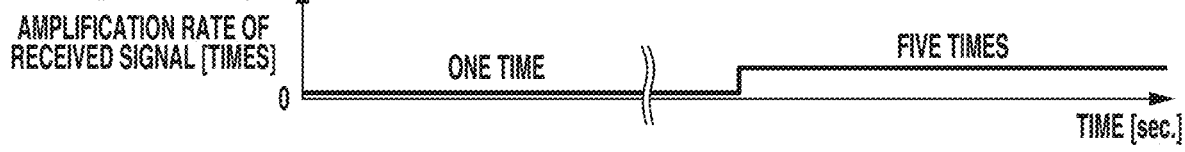
FIG.22C AMPLIFICATION RATE OF RECEIVED SIGNAL [TIMES]
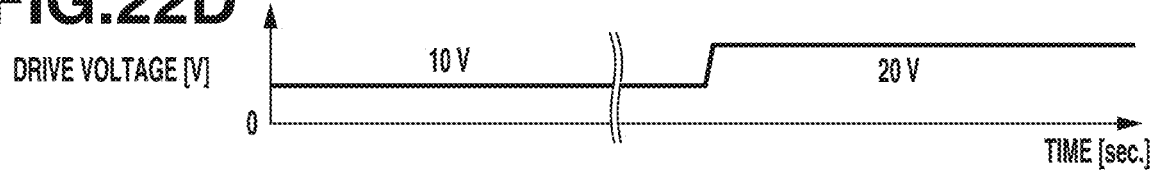
FIG.22D DRIVE VOLTAGE [V]
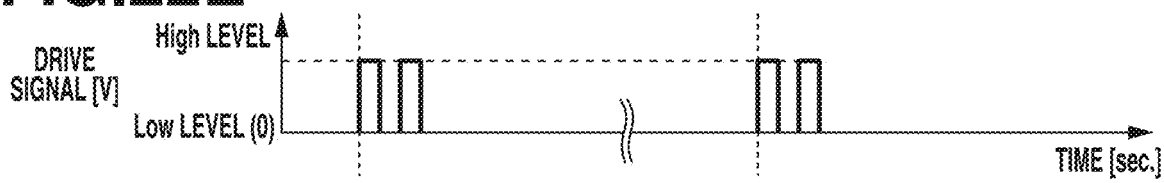
FIG.22E DRIVE SIGNAL [V]
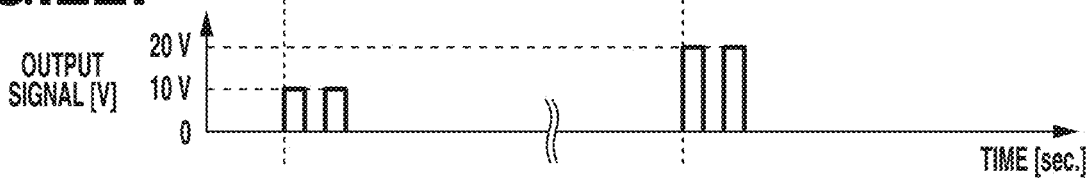
FIG.22F OUTPUT SIGNAL [V]
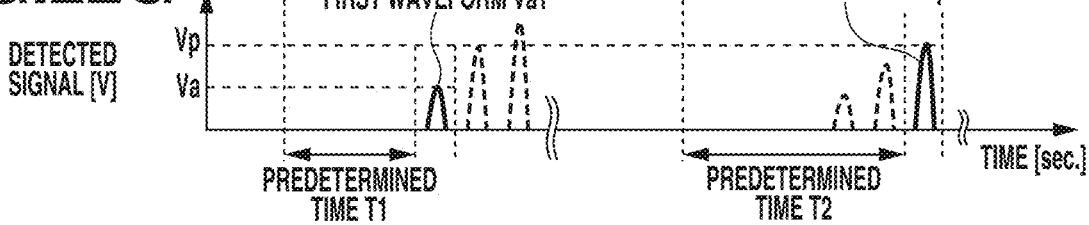
FIG.22G DETECTED SIGNAL [V]

RECORDING MATERIAL DETECTION DEVICE, IMAGE FORMING APPARATUS, AND ULTRASONIC EMISSION DEVICE

BACKGROUND

Field of the Disclosure

Aspects of the embodiments generally relate to detection of the grammage (grams per square meter ($g/m^2$)) of a recording material using ultrasonic waves.

Description of the Related Art

An image forming apparatus is configured to form images on recording materials having various features such as sizes, grammages, and surface properties. Japanese Patent Application Laid-Open No. 2004-219856 discusses an image forming apparatus which, to perform image formation associated with such recording materials, includes, therein, a recording material detection device for discriminating the type of a recording material (hereinafter referred to as a "paper type"). The recording material detection device includes, for example, an emission unit, which emits ultrasonic waves, and a reception unit, which receives ultrasonic waves, arranged opposite each other across a conveyance path through which a recording material is conveyed. The recording material detection device causes the emission unit to emit ultrasonic waves toward a recording material and the reception unit to receive ultrasonic waves transmitted through the recording material, thus providing a method of discriminating a paper type using the reception level of the received ultrasonic waves. In such a recording material detection device which detects the grammage of a recording material using ultrasonic waves, a detection result thereof may vary depending on an environment in which the recording material detection device is placed. Therefore, Japanese Patent No. 6,399,747 discusses a method of detecting a grammage based on a reception level obtained by the reception unit receiving ultrasonic waves coming not through a recording material and a reception level obtained by the reception unit receiving ultrasonic waves coming through a recording material. In this method, the reception level obtained by the reception unit receiving ultrasonic waves coming through a recording material is smaller than the reception level obtained by the reception unit receiving ultrasonic waves coming not through a recording material. Therefore, the amplification rate of the reception level obtained by the reception unit receiving ultrasonic waves coming through a recording material is made larger than the amplification rate of the reception level obtained by the reception unit receiving ultrasonic waves coming not through a recording material.

However, increasing the amplification rate of the reception level of ultrasonic waves received by the reception unit results in also amplifying a noise present in a circuit which receives ultrasonic waves. Therefore, the noise may cause a decrease in the detection accuracy of information about a grammage.

SUMMARY OF THE DISCLOSURE

A device includes a sensor including an emission unit which emits ultrasonic waves and a reception unit which receives the ultrasonic waves, the emission unit and the reception unit being arranged opposite each other across a conveyance path through which a recording material is conveyed, an instruction unit configured to input, to the emission unit, a first drive input for causing the emission unit to emit ultrasonic waves with a first maximum amplitude or a second drive input for causing the emission unit to emit ultrasonic waves with a second maximum amplitude larger than the first maximum amplitude, and a detection unit configured to detect information about a grammage of the recording material based on a first value obtained by the reception unit receiving ultrasonic waves emitted from the emission unit with the first drive input supplied thereto and coming not through the recording material and a second value obtained by the reception unit receiving ultrasonic waves emitted from the emission unit with the second drive input supplied thereto and coming through the recording material.

Further features of the disclosure will become apparent from the following description of exemplary embodiments with reference to the attached drawings.

BRIEF DESCRIPTION OF THE DRAWINGS

FIGS. 9A, 9B, 9C, 9D, 9E, 9F, 9G, and 9H are timing diagrams illustrating, for example, states of signals and states of voltages concerning the processing for calculating a detected value of the grammage, which the recording material detection device performs according to the first exemplary embodiment.

FIGS. 10A and 10B are diagrams illustrating examples of a relationship between an output waveform of an emission circuit unit, a waveform of a received signal, a waveform of a detected signal, and a noise-to-signal ratio according to the first exemplary embodiment.

FIG. 12 is a flowchart of processing for calculating a detected value of the grammage of a recording material, which the recording material detection device performs according to the fourth exemplary embodiment.

FIGS. 13A, 13B, 13C, 13D, 13E, 13F, 13G, and 13H are timing diagrams illustrating, for example, states of signals and states of voltages concerning the processing for calculating a detected value of the grammage, which the recording material detection device performs according to the fourth exemplary embodiment.

FIG. 14 is a control block diagram for a recording material detection device according to a modification example of the fourth exemplary embodiment.

FIG. 15 is a control block diagram for a recording material detection device according to a fifth exemplary embodiment.

FIGS. 17A and 17B are diagrams illustrating examples of a relationship between an output waveform of an emission circuit unit, a waveform of a received signal, a waveform of a peak detected signal, an amplification rate of the received signal, and a noise-to-signal ratio according to the fifth exemplary embodiment.

FIGS. 19A, 19B, 19C, 19D, 19E, 19F, and 19G are timing diagrams illustrating, for example, states of signals and states of voltages concerning the processing for calculating a detected value of the grammage, which the recording material detection device performs according to the fifth exemplary embodiment.

FIG. 20 is a diagram illustrating examples of a relationship between an output waveform of an emission circuit unit, a waveform of a received signal, a waveform of a peak detected signal, an amplification rate of the received signal, and a noise-to-signal ratio according to a sixth exemplary embodiment.

FIGS. 22A, 22B, 22C, 22D, 22E, 22F, and 22G are timing diagrams illustrating, for example, states of signals and states of voltages concerning the processing for calculating a detected value of the grammage, which the recording material detection device performs according to the sixth exemplary embodiment.

DESCRIPTION OF THE EMBODIMENTS

Various exemplary embodiments, features, and aspects of the disclosure will be described in detail below with reference to the drawings. Furthermore, the following exemplary embodiments are not intended to limit the disclosure set forth in the claims, and not all of the combinations of features described in the exemplary embodiments are necessarily essential for solutions in the disclosure.

[Image Forming Apparatus]

Figure 1:
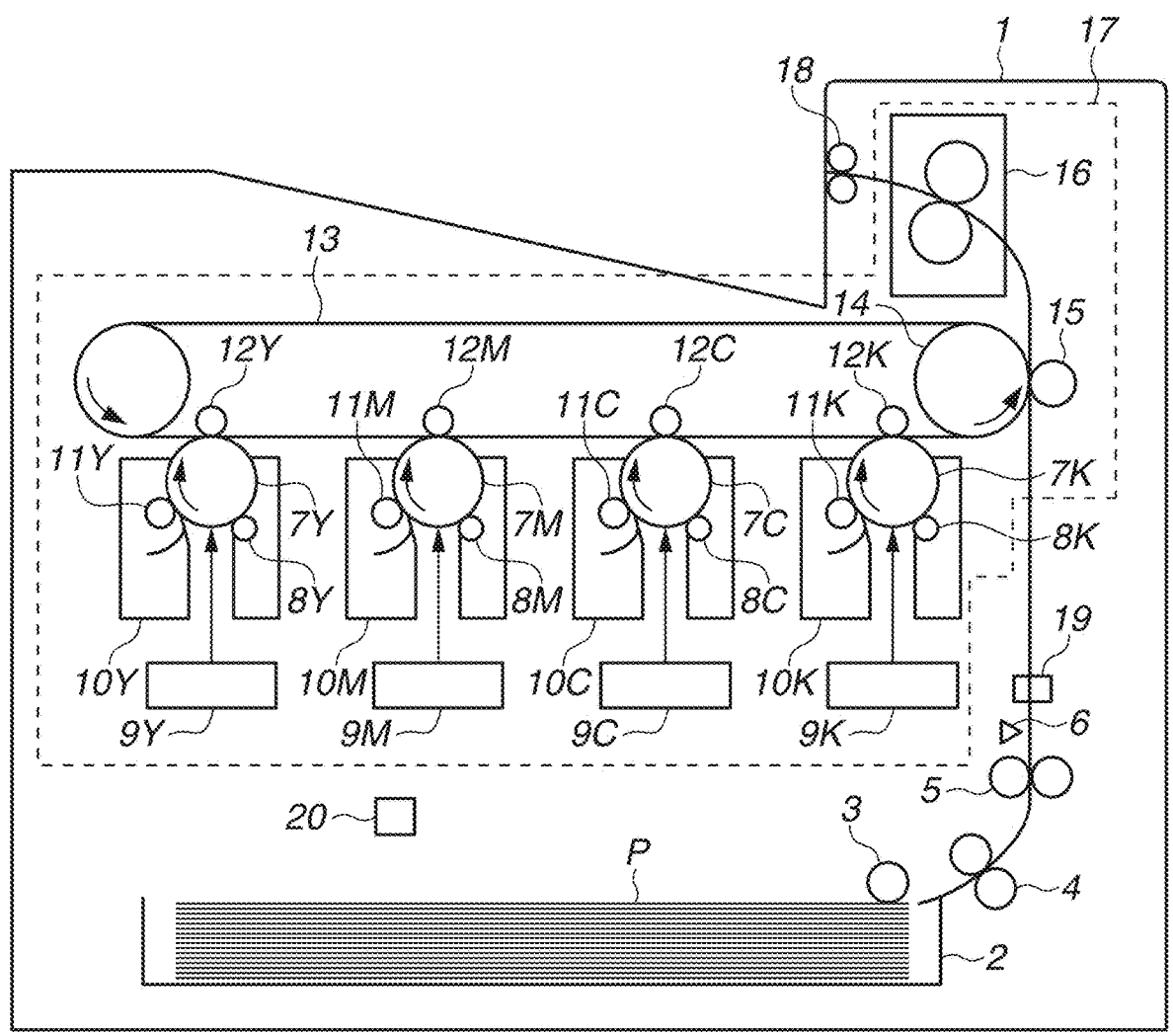
FIG. 1 is an outline configuration diagram of an image forming apparatus according to a first exemplary embodiment.

FIG. 1 is an outline configuration diagram of an image forming apparatus 1 according to a first exemplary embodiment. The image forming apparatus 1 is a full-color printer of the electrophotographic type employing an intermediate transfer system. The image forming apparatus 1 includes four image forming stations which form images of respective colors, yellow, magenta, cyan, and yellow.

Such four image forming stations are arranged in line at predetermined intervals. Furthermore, in the following description, English characters Y, M, C, and K at the tail ends of reference characters indicate that the applicable members are members related to the formation of respective toner images for yellow (Y), magenta (M), cyan (C), and black (K). In the following description, in a case where there is no need to make a distinction between colors, reference numerals with English characters Y, M, C, and K at the tail ends thereof removed may be used.

A paper feed cassette 2 is configured to stack thereon recording materials P, which are, for example, sheets of paper. A recording material P stacked on the paper feed cassette 2 is fed by a paper feed roller 3. The recording material P fed by the paper feed roller 3 is conveyed by a conveyance roller pair 4 and a registration roller pair 5. A registration sensor 6 for detecting the presence or absence of a recording material P is arranged near the registration roller pair 5.

A photosensitive drum 7 includes a photosensitive layer formed on a drum-shaped base made from aluminum and is configured to be driven by a drive device (not illustrated) to rotate at a predetermined process speed in the direction of an arrow illustrated in FIG. 1. Furthermore, the process speed as mentioned herein is equivalent to the circumferential velocity (surface movement speed) of the photosensitive drum 7. A charging roller 8 electrically charges the photosensitive drum 7 to a predetermined potential in a homogeneous manner. A laser scanner 9 radiates laser light corresponding to image information, thus exposing the surface of the photosensitive drum 7 to the laser light. With this process, an electrostatic latent image corresponding to image information is formed on the surface of the photosensitive drum 7.

A process cartridge 10 includes a development roller 11 and develops the electrostatic latent image formed on the photosensitive drum 7 with the development roller 11 using toner contained in the process cartridge 10. A primary transfer roller 12 primarily transfers an image formed on the photosensitive drum 7 to an intermediate transfer belt 13. The intermediate transfer belt 13 is driven by a driving roller 14.

A secondary transfer roller 15 secondarily transfers, to a recording material P, the image primarily transferred to the intermediate transfer belt 13. A fixing device 16 performs heating and pressing to fix the secondarily transferred image to the recording material P. Components mentioned above from the photosensitive drum 7 to the fixing device 16 related to image formation configure an example of an image forming unit 17. A paper discharge roller 18 discharges the recording material P subjected to fixing by the fixing device 16 to a paper discharge tray.

A recording material detection device 19, which serves as a detection unit, detects information about the grammage of a recording material P. In the following description, a method of discriminating the type of a recording material P based on the grammage of the recording material P and a method of controlling image forming conditions (a secondary transfer condition and a fixing condition) according to the determined type of the recording material P are described. Since, usually, the resistance value of a recording material P varies with the grammage of the recording material P, the secondary transfer condition is changed, such as application of a secondary transfer bias for secondarily transferring toner, depending on the grammage. Moreover, since the thermal capacity of a recording material P varies with the grammage of the recording material P, the fixing condition is changed, such as a fixing temperature and fixing time for fixing toner and the conveyance speed of a recording material P, depending on the grammage.

A control unit 20 includes a micro processing unit (MPU), which includes, for example, a central processing unit (CPU), and a storage unit including, for example, a random access memory (RAM), which is used for, for example, computation and temporary storing of data required for controlling the image forming apparatus 1, and a read-only memory (ROM), which stores programs and various pieces of data for controlling the image forming apparatus 1. The control unit 20 discriminates the type of a recording material P based on a detected value of information about the grammage detected by the recording material detection device 19. Then, the control unit 20 determines an image forming condition corresponding to the type of a recording material P and performs control to cause the image forming apparatus 1 to operate on the image forming condition corresponding to the type of a recording material P.

[Recording Material Detection Device 19]

Figure 2:
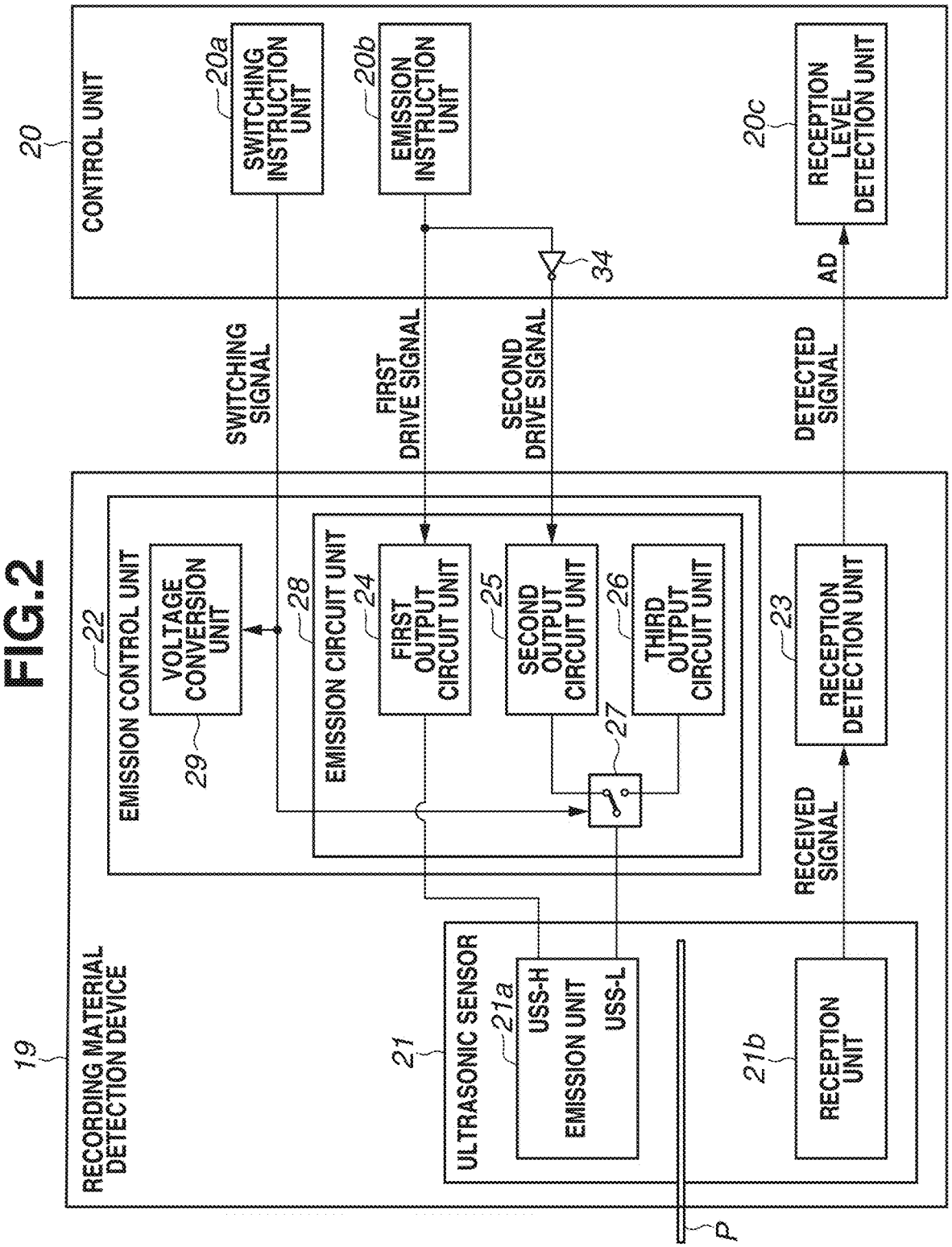
FIG. 2 is a control block diagram for a recording material detection device according to the first exemplary embodiment.

FIG. 2 is a block diagram concerning the recording material detection device 19.

The recording material detection device 19 includes an ultrasonic sensor 21, which is a grammage detection unit, an emission control unit 22, and a reception detection unit 23, and is controlled by the control unit 20.

The ultrasonic sensor 21 is a sensor which detects the grammage of a recording material P with use of ultrasonic waves, and includes an emission unit 21a, which emits ultrasonic waves, and a reception unit 21b, which receives ultrasonic waves. Furthermore, the ultrasonic sensor 21 is also referred to as an "ultrasonic emission device".

The control unit 20 includes the functions of a switching instruction unit 20a, an emission instruction unit 20b, and a reception level detection unit 20c, which are configured to control the recording material detection device 19. The switching instruction unit 20a outputs a switching signal for switching drive voltages to be supplied to the recording material detection device 19. The emission instruction unit 20b outputs drive signals for instructing the emission unit 21a to emit ultrasonic waves. At this time, the waveforms of drive signals generated by the emission instruction unit 20b become as illustrated in FIGS. 9D and 9E, in which a second drive signal is made by an operational amplifier 34 to become a signal opposite in high signal and low signal to a first drive signal. Thus, when the first drive signal is a high signal, the second drive signal becomes a low signal. Moreover, when the first drive signal is a low signal, the second drive signal becomes a high signal. The reception level detection unit 20c detects the reception level (voltage value) of ultrasonic waves received by the reception unit 21b. Furthermore, the first drive signal and the second drive signal generated when the reception unit 21b receives ultrasonic waves coming not through a recording material P are also referred to as a "first drive input". Moreover, the first drive signal and the second drive signal generated when the reception unit 21b receives ultrasonic waves coming through a recording material P are also referred to as a "second drive input".

The first exemplary embodiment is configured to, after outputting pulse waves as a drive signal to measure a received signal at one time, suspend outputting of pulse waves for a predetermined time and, after attenuation of ultrasonic waves, output pulse waves again to perform next measurement. This enables reducing the influence of, for example, reflective waves from a recording material P or a surrounding portion thereof and thus enables direct waves emitted by the emission unit 21a to be received by the reception unit 21b. Such a signal is called burst waves. Furthermore, in the first exemplary embodiment, for example, with regard to measurement at one time, pulse waves with a frequency of 40 kilohertz (kHz) are output as two pulses, and the period of burst waves is 10 milliseconds (msec).

The emission control unit 22 is a circuit unit which has the function of driving the emission unit 21a according to the first drive signal, the second drive signal, and the switching signal output from the control unit 20. The emission control unit 22 includes an emission circuit unit 28, which includes a first output circuit unit 24, a second output circuit unit 25, a third output circuit unit 26, and a switching unit 27, and a voltage conversion unit 29 (also referred to as a "voltage supply unit"). The output terminal of the first output circuit unit 24 is connected to a USS-H terminal of the emission unit 21a. Both the output terminal of the second output circuit unit 25 and the output terminal of the third output circuit unit 26 are connected to the switching unit 27, and the output terminal of the switching unit 27 is connected to a USS-L terminal of the emission unit 21a.

Furthermore, in the first exemplary embodiment, the USS-H terminal is also referred to as a first terminal and the USS-L terminal is also referred to as a second terminal. The switching unit 27 is a switching element which has the function of performing switching in response to the switching signal output from the switching instruction unit 20a to output any one of the output of the second output circuit unit 25 and the output of the third output circuit unit 26 to the USS-L terminal of the emission unit 21a. Furthermore, the switching unit 27 is also referred to as a first switching unit. In the first exemplary embodiment, when the switching signal is a high signal, a drive signal from the second output circuit unit 25 is output, and, when the switching signal is a low signal, a drive signal from the third output circuit unit 26 is output.

The emission unit 21a emits ultrasonic waves with a frequency of 40 kHz according to an output of the emission circuit unit 28. The reception unit 21b receives ultrasonic waves emitted from the emission unit 21a and outputs a received signal corresponding to the amplitude of the received ultrasonic waves to the reception detection unit 23. Furthermore, in the first exemplary embodiment, the frequency of ultrasonic waves is set to 40 kHz, but is to be a frequency available for detecting a characteristic value of the grammage of a recording material P and can be set according to characteristic features of elements. Moreover, the emission unit 21a and the reception unit 21b are arranged near a conveyance path through which to convey a recording material P in such a way as to be opposite each other across the conveyance path to enable ultrasonic waves coming through a recording material P to be received.

Furthermore, when the reception unit 21b receives ultrasonic waves coming not through a recording material P, the maximum amplitude of amplitudes of ultrasonic waves emitted by the emission unit 21a is also referred to as a "first maximum amplitude", and an input to the emission unit 21a for causing the emission unit 21a to emit ultrasonic waves with the first maximum amplitude is also referred to as a "first drive input". Moreover, when the reception unit 21b receives ultrasonic waves coming through a recording material P, the maximum amplitude of amplitudes of ultrasonic waves emitted by the emission unit 21a is also referred to as a "second maximum amplitude", and an input to the emission unit 21a for causing the emission unit 21a to emit ultrasonic waves with the second maximum amplitude is also referred to as a "second drive input".

The reception detection unit 23 is a circuit unit which has the function of amplifying the amplitude of a received signal obtained by the reception unit 21b receiving ultrasonic waves coming through a recording material P and thus performing half-wave rectification thereof, as illustrated in FIG. 10A. A detected signal generated by the reception detection unit 23 is input to an analog-to-digital (AD) port of the control unit 20 and is thus converted from an analog signal into a digital signal by the reception level detection unit 20c. The control unit 20 detects the waveform of the detected signal based on the digital signal obtained by the reception level detection unit 20c performing conversion, and calculates a peak value (maximum value) thereof as a reception level of ultrasonic waves. Moreover, in the first exemplary embodiment, the calculation of a reception level uses a peak value included in a detected signal output from the reception detection unit 23, but to use a characteristic value available for determining the level of a received signal, such as an effective value or an average value. Furthermore, the reception detection unit 23 is also referred to as a "reception detection unit".

Here, the reason why, in the first exemplary embodiment, when the reception unit 21b receives ultrasonic waves coming not through a recording material P, the switching signal is set as a low signal and a voltage Vc to be supplied to the emission unit 21a is set as 2 volts (V) is described.

In the first exemplary embodiment, as illustrated in FIGS. 10A and 10B, a received signal received by the reception unit 21b becomes a detected signal subjected to half-wave rectification by the reception detection unit 23. At this time, in a case where the amplification rate of a received signal is not adjusted by the reception detection unit 23, the value of a detected signal which the reception detection unit 23 is able to generate has an upper limit. In a case where the detected signal has a value less than or equal to the upper limit, a peak value (maximum value) calculated based on a digital signal obtained by the reception level detection unit 20c performing conversion from an analog signal is able to be calculated as a reception level of ultrasonic waves. However, in a case where the amplitude of a received signal is large and, thus, a detected signal reaches a value greater than the upper limit of a detected signal which the reception detection unit 23 is able to generate, a peak value (maximum value) calculated by the reception level detection unit 20c becomes up to the value of the upper limit of a detected signal which the reception detection unit 23 is able to generate. Therefore, even in a case where the reception unit 21b receives ultrasonic waves coming not through a recording material P, if a voltage of 10 V is supplied to the emission unit 21a, the amplitude of the detected signal is too large, so that the detected signal exceeds the value of the upper limit of a detected signal which the reception detection unit 23 is able to generate. Therefore, in a case where the reception unit 21b receives ultrasonic waves coming not through a recording material P, the switching signal is set as a low signal and, thus, a voltage Vc to be supplied to the emission unit 21a is set as 2 V.

Moreover, in the first exemplary embodiment, in a case where the reception unit 21b receives ultrasonic waves coming not through a recording material P, a voltage Vc to be supplied to the emission unit 21a is set as 2 V, but can be set greater than or equal to 2 V. Furthermore, as long as the value of a reception level Va described below is less than or equal to the value of a detected signal which the reception detection unit 23 is able to generate, a voltage Vc to be supplied to the emission unit 21a can be greater than or equal to 2 V.

<Correction of Positional Variation Between Reception Unit 21b and Emission Unit 21a>

Next, the correction of a positional variation between the reception unit 21b and the emission unit 21a, which is required to perform paper type discrimination, is described.

In a manufacturing process for the image forming apparatus 1, at the time of attachment of the ultrasonic sensor 21 to the image forming apparatus 1, a positional relationship between the reception unit 21b and the emission unit 21a with respect to a recording material P targeted for detection may vary. Such a positional variation may cause a time in which ultrasonic waves arrive at the reception unit 21b to vary and may also cause a time in which a reception level detected by the reception level detection unit 20c becomes a peak value to vary. Therefore, calculating a correction coefficient as described below is employed to enable detecting a grammage with a positional variation corrected.

In a case where the reception unit 21b receives ultrasonic waves coming not through a recording material P, a reception level output from the reception level detection unit 20c is denoted by Va. Moreover, in a case where the reception unit 21b receives ultrasonic waves coming through a recording material P, a reception level output from the reception level detection unit 20c is denoted by Vp. A position correction coefficient T is calculated with use of the reception level Va and the reception level Vp as in the following equation (1). Furthermore, in the first exemplary embodiment, the reception level Va is also referred to as a "first value", and the reception level Vp is also referred to as a "second value".

$$T = Vp/Va \quad (1)$$

Figure 3:
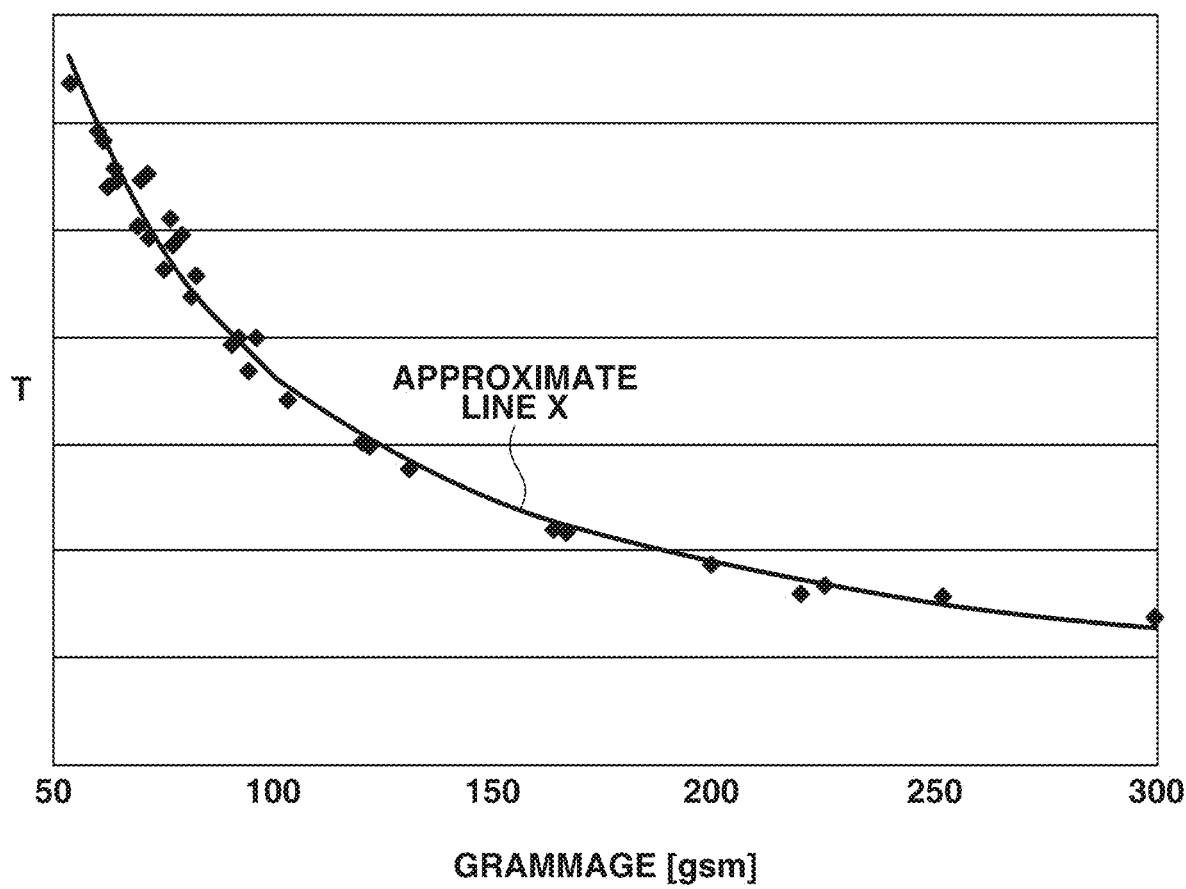
FIG. 3 is a graph showing an approximate expression obtained by plotting a relationship between a position correction coefficient and the grammage of a recording material.

The control unit 20 calculates a grammage by using a graph representing an approximate expression obtained by plotting a relationship between the position correction coefficient T and the value of the grammage of a recording material P as illustrated in FIG. 3. Then, the control unit 20 determines the paper type of a recording material P based on the calculated grammage, determines an image forming condition corresponding to the type of a recording material P, and controls an operation of the image forming apparatus 1 according to the image forming condition. The approximate expression as used herein is previously obtained from actual grammages and correction coefficients T and is stored in a non-volatile memory of the control unit 20. While, in the first exemplary embodiment, an approximate expression is used, a conversion table representing a relationship between the position correction coefficient T and the value of the grammage of a recording material P can be used.

<Attenuation of Ultrasonic Waves by Recording Material P and Discrimination Method for Paper Type>

In the following description, the attenuation of ultrasonic waves by a recording material P is described. The amount of attenuation of ultrasonic waves transmitted through a recording material P becomes larger in proportion to the grammage of a recording material P. Thus, since, as the grammage of a recording material P increases, the amount of attenuation of ultrasonic waves becomes larger, the value of the reception level Vp becomes smaller. In a case where the recording material P is thin paper, which is small in grammage, since the amount of attenuation of ultrasonic waves is smaller than that for plain paper, the value of the reception level Vp becomes larger than that for plain paper. On the other hand, in a case where the recording material P is heavy paper, which is large in grammage, since the amount of attenuation of ultrasonic waves is greater than that for plain paper, the value of the reception level Vp becomes smaller than that for plain paper. Thus, in a case where the value of the reception level Vp becomes larger, the value of the position correction coefficient T also becomes larger.

For example, the control unit 20 obtains a grammage corresponding to the value of the position correction coefficient T with use of an approximate line X illustrated in FIG. 3. In a case where the grammage obtained by the control unit 20 is smaller than a given threshold value, the control unit 20 determines that the paper type of a recording material P is thin paper. Moreover, in a case where the grammage obtained by the control unit 20 is larger than the given threshold value, the control unit 20 determines that the paper type of a recording material P is heavy paper. The given threshold value as used herein is a value based on which it is determined that, for example, as illustrated in FIG. 3, if the grammage is less than or equal to 59 g/m$^2$, the paper type is thin paper, if the grammage is 60 g/m$^2$ to 90 g/m$^2$ inclusive, the paper type is plain paper, and, if the grammage is greater than 90 g/m$^2$, the paper type is heavy paper. Furthermore, the discrimination method for the paper type is not limited to this, and a relationship between the grammage and the paper type can be previously stored in a non-volatile memory and information about the stored relationship can be used for discrimination.

<Operation Outline of Emission Control Unit 22>

Figure 4:
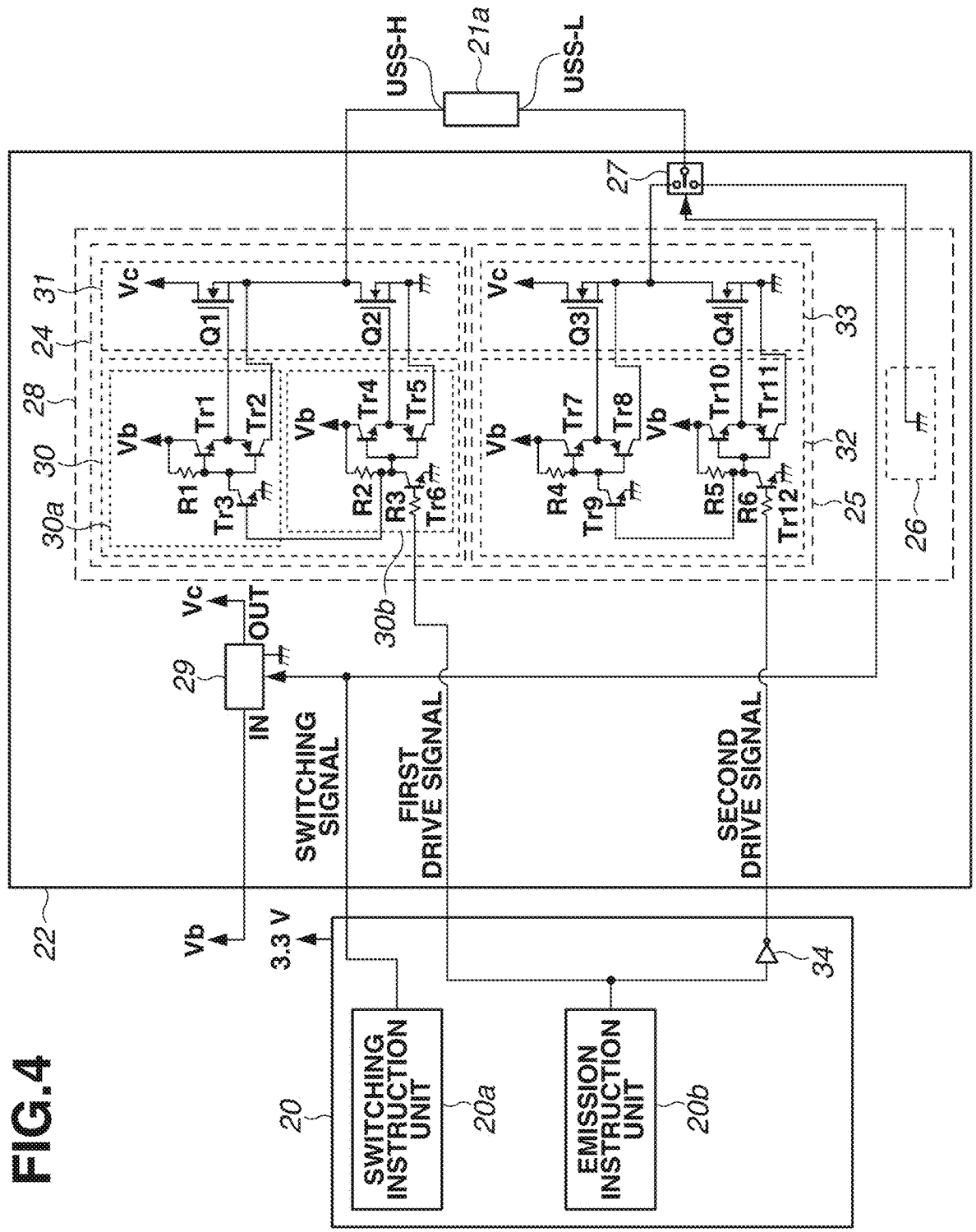
FIG. 4 is an example of an outline configuration diagram of an emission control unit according to the first exemplary embodiment.

An operation outline of the emission control unit 22 is described with reference to FIG. 4. FIG. 4 is an example of an outline configuration diagram of the emission control unit 22.

The emission control unit 22 receives a voltage Vb supplied from a power supply unit (not illustrated) included in the image forming apparatus 1. The voltage conversion unit 29 is a voltage lowering converter which converts the voltage Vb supplied from the power supply unit (not illustrated) into a given voltage Vc. The voltage Vc obtained by the voltage conversion unit 29 is supplied to the emission circuit unit 28. In the first exemplary embodiment, the voltage conversion unit 29 switches the voltage Vc to one of 2 V and 10 V according to the switching signal output from the switching instruction unit 20a. In a case where the switching signal is a high signal, the voltage Vc becomes 10 V, and, in a case where the switching signal is a low signal, the voltage Vc becomes 2 V. Furthermore, in the first exemplary embodiment, a voltage of 2 V, which is the voltage Vc obtained in a case where the switching signal is a low signal, is also referred to as a "first drive voltage", and a voltage of 10 V, which is the voltage Vc obtained in a case where the switching signal is a high signal, is also referred to as a "second drive voltage". Furthermore, while, in the first exemplary embodiment, a voltage lowering converter is used as the voltage conversion unit 29, a converter capable of switching between voltages required for driving the emission circuit unit 28 can be used instead. For example, a boosting converter which boosts a voltage of 3.3 V can be used. Moreover, the voltage Vc can be set as appropriate within a voltage range available for the emission unit 21a to emit ultrasound waves (also referred to as an "operable range voltage"). Additionally, in one embodiment, the voltage Vc is switchable between an upper limit side voltage and a lower limit side voltage within the voltage range available for the emission unit 21a to emit ultrasound waves. Since the operable range voltage for the emission unit 21a in the first exemplary embodiment is 2 V to 10 V, the switchable voltages Vc are set as 2 V and 10 V.

The emission circuit unit 28 includes the first output circuit unit 24, the second output circuit unit 25, and the third output circuit unit 26. The first output circuit unit 24 includes a gate drive circuit unit 30 and a half-bridge circuit unit 31. The second output circuit unit 25 includes a gate drive circuit unit 32 and a half-bridge circuit unit 33. The third output circuit unit 26 is connected to ground (also abbreviated to GND) and is configured with a circuit capable of outputting a voltage of 0 V, which is a fixed voltage.

The half-bridge circuit unit 31 includes a switching element Q1 connected to the voltage Vc and a switching element Q2 connected in series to the switching element Q1. Each of the switching element Q1 and the switching element Q2 is configured with a metal-oxide semiconductor field-effect transistor (MOSFET). The voltage Vc is supplied to the switching element Q1, and a voltage corresponding to ground is supplied to the switching element Q2.

The gate drive circuit unit 30 includes a gate drive circuit unit 30a, which drives the switching element Q1, and a gate drive circuit unit 30b, which drives the switching element Q2. The gate drive circuit unit 30a includes an NPN transistor Tr1, a PNP transistor Tr2, an NPN transistor Tr3, and a resistor R1. The NPN transistor Tr3 is connected to ground, and the resistor R1 is connected to the power supply voltage Vb. The gate drive circuit unit 30b includes an NPN transistor Tr4, a PNP transistor Tr5, an NPN transistor Tr6, a resistor R2, and a resistor R3. The NPN transistor Tr6 is connected to ground, and the resistor R2 is connected to the power supply voltage Vb.

The first drive signal output from the emission instruction unit 20b is input to the resistor R3 and the NPN transistor Tr6 of the gate drive circuit unit 30b. In a case where the first drive signal is a high signal, since the NPN transistor Tr6 is connected to ground, a voltage of 0 V is input to the base terminals of the NPN transistor Tr4 and the PNP transistor Tr5. When a voltage of 0 V is input to the base terminals of the NPN transistor Tr4 and the PNP transistor Tr5, a voltage of 0 V is output as a drive signal for the switching element Q2 from a connection point between the emitter terminal of the NPN transistor Tr4 and the collector terminal of the PNP transistor Tr5. Moreover, in a case where the first drive signal is a high signal, for the above-mentioned reason, a voltage of 0 V is input from the collector terminal of the NPN transistor Tr6 to the NPN transistor Tr3 of the gate drive circuit unit 30a.

In a case where the first drive signal is a low signal, the voltage Vb is input to the base terminals of the NPN transistor Tr4 and the PNP transistor Tr5 via the resistor R2. When the voltage Vb is input to the base terminals of the NPN transistor Tr4 and the PNP transistor Tr5, the voltage Vb is output as a drive signal for the switching element Q2 from a connection point between the emitter terminal of the NPN transistor Tr4 and the collector terminal of the PNP transistor Tr5. Moreover, in a case where the first drive signal is a low signal, for the above-mentioned reason, the voltage Vb is input from the collector terminal of the NPN transistor Tr6 to the NPN transistor Tr3 of the gate drive circuit unit 30a.

In a case where the voltage Vb has been input to the NPN transistor Tr3 of the gate drive circuit unit 30a, since the NPN transistor Tr3 is connected to ground, a voltage of 0 V is input to the base terminals of the NPN transistor Tr1 and the PNP transistor Tr2. When a voltage of 0 V is input to the base terminals of the NPN transistor Tr1 and the PNP transistor Tr2, a voltage of 0 V is output as a drive signal for the switching element Q1 from a connection point between the emitter terminal of the NPN transistor Tr1 and the collector terminal of the PNP transistor Tr2.

In a case where a voltage of 0 V has been input to the NPN transistor Tr3 of the gate drive circuit unit 30a, the voltage Vb is input to the base terminals of the NPN transistor Tr1 and the PNP transistor Tr2 via the resistor R1. When the voltage Vb is input to the base terminals of the NPN transistor Tr1 and the PNP transistor Tr2, the voltage Vb is output as a drive signal for the switching element Q1 from a connection point between the emitter terminal of the NPN transistor Tr1 and the collector terminal of the PNP transistor Tr2.

In this way, in a case where the first drive signal is a high signal, the output of the gate drive circuit unit 30b becomes 0 V and the output of the gate drive circuit unit 30a becomes the voltage Vb. Moreover, in a case where the first drive signal is a low signal, the output of the gate drive circuit unit 30b becomes the voltage Vb and the output of the gate drive circuit unit 30a becomes 0 V. Therefore, a relationship between the outputs of the gate drive circuit unit 30b and the gate drive circuit unit 30a becomes opposite between a case where the first drive signal is a high signal and a case where the first drive signal is a low signal. Thus, in a case where the first drive signal is a high signal, the switching element Q1 receives the voltage Vb as an input and, therefore, comes into an on-state and the switching element Q2 receives a voltage of 0 V as an input and, therefore, comes into an off-state. Therefore, no voltage is supplied from the switching element Q2 and the voltage Vc is output from the switching element Q1 as an output voltage of the half-bridge circuit unit 31. Moreover, in a case where the first drive signal is a low signal, the switching element Q1 receives a voltage of 0 V as an input and, therefore, comes into an off-state and the switching element Q2 receives the voltage Vb as an input and, therefore, comes into an on-state. Therefore, no voltage is supplied from the switching element Q1 and a voltage of 0 V is output from the switching element Q2 as an output voltage of the half-bridge circuit unit 31. In this way, according to the switching operations of the switching element Q1 and the switching element Q2 depending on a change of the first drive signal, the voltage Vc and a voltage of 0 V are alternately input to the USS-H terminal of the emission unit 21a as an output of the half-bridge circuit unit 31.

The second output circuit unit 25 has a circuit configuration similar to that of the first output circuit unit 24 although differing in that the second drive signal to be input to the second output circuit unit 25 is opposite to the first drive signal in a relationship between a high signal and a low signal. Therefore, an operation outline of the second output circuit unit 25 is omitted from description.

A circuit to be connected to the USS-L terminal of the emission unit 21a is switched between the second output circuit unit 25 and the third output circuit unit 26 by the switching unit 27 according to a signal output from the switching instruction unit 20a. This switching results in switching the drive mode of the emission unit 21a between a half-bridge drive mode and a full-bridge drive mode. In the following description, each of the half-bridge drive mode and the full-bridge drive mode is described.

[Half-Bridge Drive Mode]

When the switching signal is a low signal, the USS-L terminal is connected to the ground of the third output circuit unit 26. Accordingly, the emission unit 21a is driven with 2 V by the first output circuit unit 24. Thus, when receiving, as an input, burst waves of 2 V from the switching element Q1 of the first output circuit unit 24 via the USS-H terminal, the emission unit 21a receives, as an input, a voltage of 0 V from the third output circuit unit 26 via the USS-L terminal. In the first exemplary embodiment, this state is also referred to as a "first state". Moreover, when receiving, as an input, a voltage of 0 V from the switching element Q2 of the first output circuit unit 24 via the USS-H terminal, the emission unit 21a receives, as an input, a voltage of 0 V from the third output circuit unit 26 via the USS-L terminal. In the first exemplary embodiment, this state is also referred to as a "second state".

In this way, in response to alternately receiving, as inputs, a voltage of 0 V and burst waves of 2 V from the switching element Q1 and the switching element Q2 via the USS-H terminal, the emission unit 21a emits ultrasonic waves. Furthermore, an operation mode of the bridge circuit performed when the switching signal is a low signal is also referred to as a "half-bridge drive mode".

[Full-Bridge Drive Mode]

When the switching signal is a high signal, the USS-L terminal is connected to the second output circuit unit 25.

Accordingly, the emission unit 21a is connected to both the first output circuit unit 24 and the second output circuit unit 25 and is, therefore, driven with 10 V. Thus, when receiving, as an input, burst waves of 10 V from the switching element Q1 via the USS-H terminal, the emission unit 21a receives, as an input, a voltage of 0 V from the switching element Q4 via the USS-L terminal. In the first exemplary embodiment, this state is also referred to as a "third state". Moreover, when receiving, as an input, a voltage of 0 V from the switching element Q2 via the USS-H terminal, the emission unit 21a receives, as an input, burst waves of 10 V from the switching element Q3 via the USS-L terminal. In the first exemplary embodiment, this state is also referred to as a "fourth state". In this way, in response to alternately receiving, as inputs, burst waves of 10 V via the USS-H terminal and the USS-L terminal, the emission unit 21a is able to emit ultrasonic waves larger in amplitude than in the half-bridge drive mode. Furthermore, an operation mode of the bridge circuit performed when the switching signal is a high signal is also referred to as a "full-bridge drive mode". Accordingly, in the first exemplary embodiment, in a case where the reception unit 21b receives ultrasonic waves coming through a recording material P, the emission control unit 22 drives the emission unit 21a in the full-bridge drive mode.

Figure 5:
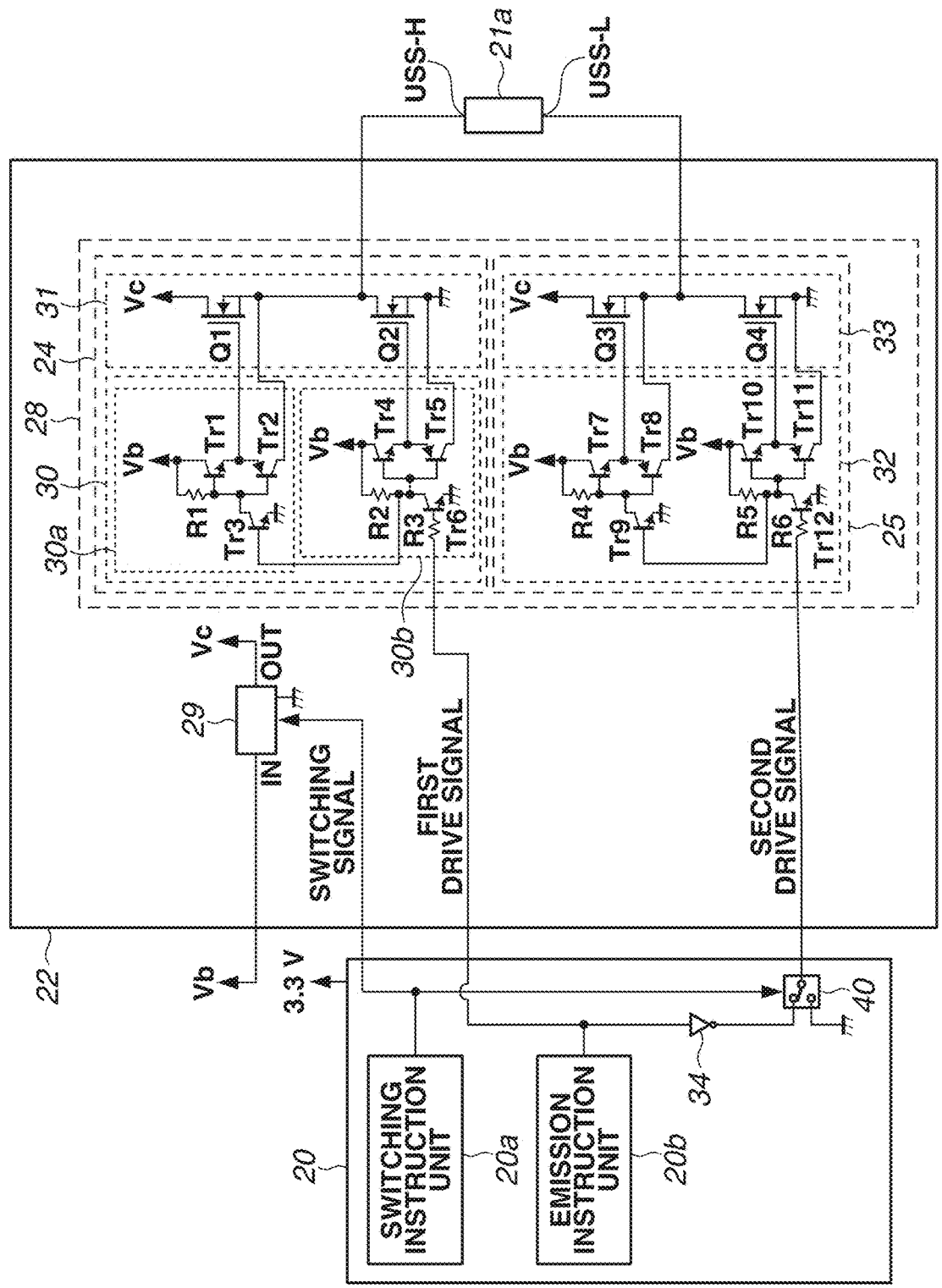
FIG. 5 is an example of an outline configuration diagram of the emission control unit according to the first exemplary embodiment.

Furthermore, in the first exemplary embodiment, the method of switching from the full-bridge drive mode to the half-bridge drive mode includes the switching element of the switching unit 27 switching from the output of the second output circuit unit 25 to the output of the third output circuit unit 26. However, a fixed voltage is to be able to be input to the USS-L terminal of the emission unit 21a. For example, as illustrated in FIG. 5, a switching unit 40 switching between inputting the second drive signal output from emission instruction unit 20b to the second output circuit unit 25 and inputting a fixed voltage (0 V) corresponding to ground to the second output circuit unit 25 can be employed. Furthermore, the switching unit 40 is also referred to as a "second switching unit". Moreover, at this time, when the switching signal output from the switching instruction unit 20a is a high signal, the second drive signal output from the emission instruction unit 20b is input to the second output circuit unit 25. Furthermore, the emission instruction unit 20b, which outputs the second drive signal to be input to the second output circuit unit 25, is also referred to as a "fourth output circuit unit". Moreover, when the switching signal output from the switching instruction unit 20a is a low signal, a fixed voltage (0 V) corresponding to ground is input to the second output circuit unit 25. Furthermore, the circuit which is connected to ground and is able to output 0 V serving as a fixed voltage is also referred to as a "fifth output circuit unit". Even in this case, if the switching signal is a low signal, regardless of a drive signal output from the emission instruction unit 20b, a voltage of 0 V is input from ground to the second output circuit unit 25.

This enables maintaining a state in which a voltage of 0 V is supplied to the USS-L terminal. Therefore, the emission unit 21a operates in the half-bridge drive mode.

In the following description, an operation performed in a case where the switching signal output from the switching instruction unit 20a is a low signal and a fixed voltage (0 V) corresponding to ground is made by the switching unit 40 to be input to the second output circuit unit 25 is described. When receiving, as an input, burst waves of 2 V from the switching element Q1 of the first output circuit unit 24 via the USS-H terminal, the emission unit 21a receives, as an input, a voltage of 0 V from the second output circuit unit 25. This state is also referred to as a "fifth state". Moreover, when receiving, as an input, a voltage of 0 V from the switching element Q2 of the first output circuit unit 24 via the USS-H terminal, the emission unit 21a also receives, as an input, a voltage of 0 V from the second output circuit unit 25. This state is also referred to as a "sixth state".

In the following description, an operation performed in a case where the switching signal output from the switching instruction unit 20a is a high signal and the second drive signal is made by the switching unit 40 to be input from the emission instruction unit 20b to the second output circuit unit 25 is described. When receiving, as an input, burst waves of 10 V from the switching element Q1 of the first output circuit unit 24 via the USS-H terminal, the emission unit 21a receives, as an input, a voltage of 0 V from the switching element Q4 of the second output circuit unit 25. This state is also referred to as a "seventh state". Moreover, when receiving, as an input, a voltage of 0 V from the switching element Q2 of the first output circuit unit 24 via the USS-H terminal, the emission unit 21a receives, as an input, burst waves of 10 V from the switching element Q3 of the second output circuit unit 25. This state is also referred to as an "eighth state".

Furthermore, switching between the half-bridge drive mode and the full-bridge drive mode is to be able to be performed, and the types of elements of the half-bridge drive circuit and the configuration of the gate drive circuit can be configured to be changeable as appropriate.

[Switching of Voltage Vc According to Presence or Absence of Recording Material P]

Figure 8:
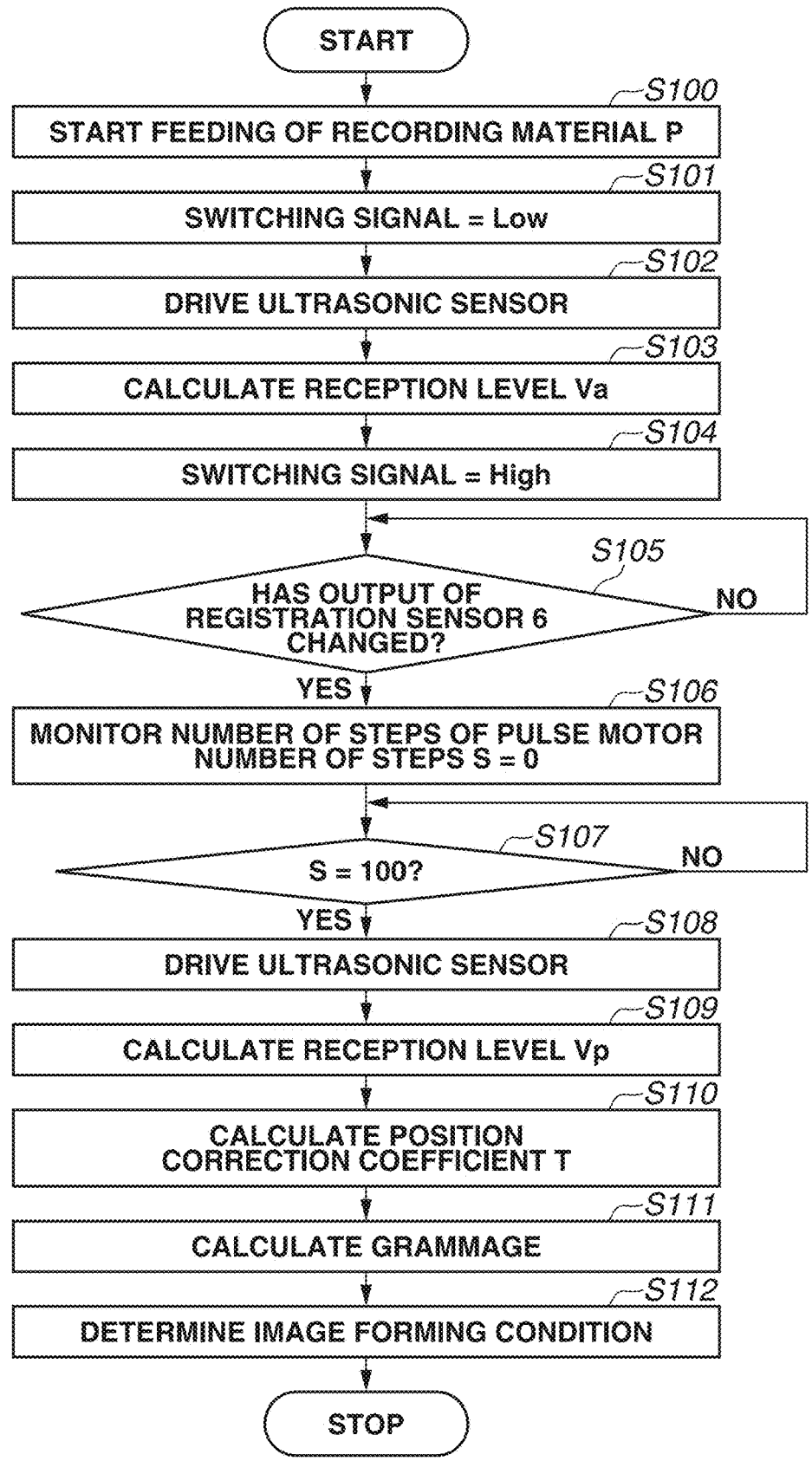
FIG. 8 is a flowchart of processing for calculating a detected value of the grammage of a recording material, which the recording material detection device performs according to the first exemplary embodiment.

In the following description, a method of, by controlling the voltage conversion unit 29, reducing a noise-to-signal ratio of the reception level Vp output from the reception level detection unit 20c in a case where the reception unit 21b has received ultrasonic waves coming through a recording material P is described with reference to FIG. 8 and FIGS. 9A, 9B, 9C, 9D, 9E, 9F, 9G, and 9H. FIG. 8 is a flowchart of processing for calculating the grammage of a recording material P, and FIGS. 9A to 9H are timing diagrams illustrating, for example, states of signals and states of voltages concerning processing for calculating the grammage.

In step S100, in response to receiving a printing instruction, the control unit 20 starts a paper feeding operation.

In step S101, the switching instruction unit 20a outputs a low signal as the switching signal, as illustrated in FIG. 9B, to the voltage conversion unit 29, thus causing the first output circuit unit 24 via the voltage conversion unit 29 to output a voltage Vc of 2 V. Accordingly, the emission unit 21a is driven in the half-bridge drive mode.

In step S102, the control unit 20 performs the following processing at timing at which, after the start of the paper feeding operation, a recording material P has not yet arrived at the ultrasonic sensor 21. Thus, as illustrated in FIG. 9A, the control unit 20 starts measuring the reception level of ultrasonic waves via the reception unit 21b obtained in a case where the reception unit 21b receives ultrasonic waves coming not through a recording material P. At this time, the emission circuit unit 28 drives the emission unit 21a in the half-bridge drive mode. Thus, as illustrated in FIG. 9F, a voltage of 2 V and a voltage of 0 V are alternately input from the first output circuit unit 24 to the USS-H terminal, and, as illustrated in FIG. 9G, a voltage of 0 V is input from the third output circuit unit 26 to the USS-L terminal.

In step S103, the reception detection unit 23 generates a detected signal, such as that illustrated in FIG. 9H, based on a received signal obtained by the reception unit 21b during a period until a predetermined time elapses from the start of measurement of the reception level of the received signal, thus calculating a reception level Va. At this time, the detected signal generated by the reception detection unit 23 is converted by the reception detection unit 23 into waveforms having a peak value at intervals of the half wavelength of 40 kHz, which is the same as the frequency of ultrasonic waves emitted from the emission unit 21a. Moreover, at this time, even if the number of pulses of the first drive signal is two as illustrated in FIG. 9D, the number of waveforms of the detected signal such as that illustrated in FIG. 9H becomes a number exceeding two. This is because there is a reverberation in the emission unit 21a or the reception unit 21b. The control unit 20 detects the second waveform of the detected signal obtained by the reception level detection unit 20c performing conversion and then calculates a peak value of the second waveform. At this time, the control unit 20 calculates a peak value of the second waveform by detecting a detected signal obtained during a given predetermined time synchronized with the first drive signal. The predetermined time as used herein is set by previously performing calculation based on a relationship between the distance between the emission unit 21a and the reception unit 21b and the sound speed of ultrasonic waves. Furthermore, in the first exemplary embodiment, the control unit 20 starts a paper feeding operation in step S100, but can be configured to start a paper feeding operation after the reception level Va has been calculated by the reception detection unit 23.

In step S104, the switching instruction unit 20a outputs a high signal as the switching signal, as illustrated in FIG. 9B, to the voltage conversion unit 29, thus causing the first output circuit unit 24 via the voltage conversion unit 29 to output a voltage Vc of 10 V, as illustrated in FIG. 9C. Accordingly, the emission control unit 22 drives the emission unit 21a in the full-bridge drive mode.

In step S105, the control unit 20 determines whether the front edge of a recording material P has arrived at the registration sensor 6 and, thus, the output of the registration sensor 6 has changed, and, if it is determined that the output of the registration sensor 6 has become an output indicating detection of a recording material P (YES in step S105), the control unit 20 advances the processing to step S106.

In step S106, to detect timing at which the front edge of a recording material P arrives at the ultrasonic sensor 21 after arriving at the registration sensor 6, the control unit 20 starts counting of the number of steps S of a pulse motor (not illustrated).

In step S107, the control unit 20 determines whether the counted value of the number of steps S has reached a predetermined value (100), and, if it is determined that the counted value of the number of steps S has reached the predetermined value (100) (YES in step S107), the control unit 20 advances the processing to step S108.

In step S108, the control unit 20 causes the emission circuit unit 28 to drive the ultrasonic sensor 21 and starts measurement of a reception level of the received signal performed by the reception detection unit 23 in a case where the reception unit 21b receives ultrasonic waves coming through a recording material P. At this time, the emission circuit unit 28 drives the emission unit 21a in the full-bridge drive mode. Accordingly, a voltage of 10 V output from the first output circuit unit 24 as illustrated in FIG. 9F and a voltage of 10 V output from the second output circuit unit 25 as illustrated in FIG. 9G are alternately input to the USS-H terminal and the USS-L terminal, respectively.

In step S109, the reception detection unit 23 performs the following processing in a manner similar to the measurement method performed in a case where the reception unit 21b receives ultrasonic waves coming not through a recording material P. Thus, the reception detection unit 23 performs detection of a detected signal obtained during a period until a predetermined time elapses from the start of measurement and calculates a reception level Vp obtained in a case where the reception unit 21b receives ultrasonic waves coming through a recording material P.

In step S110, the control unit 20 substitutes the reception levels Va and Vp for the above-mentioned equation (1), thus calculating the position correction coefficient T. In step S111, the control unit 20 calculates the grammage of a recording material P with use of the calculated position correction coefficient T and the approximate expression previously stored in the storage unit. In step S112, the control unit 20 determines an image forming condition according to the calculated grammage, and then ends the processing. Furthermore, in the first exemplary embodiment, the control unit 20 can calculate the grammage based on the position correction coefficient T or can change the image forming condition based on the position correction coefficient T. Moreover, in the first exemplary embodiment, the control unit 20 can discriminate a paper type based on the position correction coefficient T.

In the above-described way, in a case where the reception unit 21b receives ultrasonic waves coming not through a recording material P, in response to the emission circuit unit 28 inputting a voltage of 2 V to the USS-H terminal and inputting a voltage of 0 V to the USS-L terminal, the emission unit 21a emits ultrasonic waves having an amplitude obtained in a case where a voltage of 2 V is supplied. On the other hand, in a case where the reception unit 21b receives ultrasonic waves coming through a recording material P, in response to the emission circuit unit 28 alternately inputting a voltage of 10 V to the USS-H terminal and the USS-L terminal, the emission unit 21a is able to emit ultrasonic waves having an amplitude equivalent to an amplitude obtained in a case where a voltage of 20 V is supplied. Accordingly, in a case where the reception unit 21b receives ultrasonic waves coming through a recording material P, it is possible to make the amplification rate of a received signal of ultrasonic waves smaller and, thus, it is possible to reduce an influence which a noise present in a circuit which receives ultrasonic waves exerts on a detection result of the grammage.

<Comparison Between Method in First Exemplary Embodiment and Conventional Method>

In the following description, a coping method for preventing or reducing a decrease in the detection accuracy of a grammage in the first exemplary embodiment is described while being compared with a conventional method. FIGS. 10A and 10B are diagrams illustrating examples of a relationship between an output waveform of the emission circuit unit 28, a waveform of the received signal, a waveform of the detected signal, and a noise-to-signal ratio. FIG. 10A is a diagram for the conventional method, and FIG. 10B is a diagram for the first exemplary embodiment.

In the conventional method, as illustrated in FIG. 10A, a received signal obtained in a case where the reception unit 21b receives ultrasonic waves coming through a recording material P attenuates more than a received signal obtained in a case where the reception unit 21b receives ultrasonic waves coming not through a recording material P. Therefore, in a case where the reception unit 21b receives ultrasonic waves coming through a recording material P, whatever paper type the recording material P is, the conventional method calculates the reception level Vp using a detected signal obtained by amplifying the received signal at a given amplification rate previously set, thus detecting a grammage. In this example, the amplification rate is raised from one time to 20 times. However, at this time, when the received signal obtained in a case where the reception unit 21b has received ultrasonic waves coming through a recording material P is amplified, a noise signal (not illustrated) present in a circuit which receives ultrasonic waves is also amplified. Therefore, a noise-to-signal ratio, which is the ratio of the noise signal to the received signal of ultrasonic waves, becomes larger.

On the other hand, in the first exemplary embodiment, as illustrated in FIG. 10B, in a case where the reception unit 21b receives ultrasonic waves coming through a recording material P, the first exemplary embodiment is configured not to amplify the received signal but to increase the output voltage of the emission circuit unit 28. In this way, increasing a drive voltage to be supplied to the emission unit 21a enables obtaining a received signal with a large amplitude. Therefore, it is possible to set the amplification rate of a received signal of ultrasonic waves smaller and, thus, it is possible to prevent or reduce the noise-to-signal ratio from becoming large.

As described above, according to the first exemplary embodiment, the following beneficial effects can be obtained. In a case where the reception unit 21b receives ultrasonic waves coming not through a recording material P, the control unit 20 uses a voltage at the lower limit side of the operable range voltage of the emission unit 21a to drive the emission unit 21a in the half-bridge drive mode and causes the reception level detection unit 20c to calculate the reception level Va. In a case where the reception unit 21b receives ultrasonic waves coming through a recording material P, the control unit 20 uses a voltage at the upper limit side of the operable range voltage of the emission unit 21a to drive the emission unit 21a in the full-bridge drive mode and causes the reception level detection unit 20c to calculate the reception level Vp. Switching voltages and the operation modes of the bridge circuit enables increasing the amplitude of ultrasonic waves which the emission unit 21a emits and also enables increasing the amplitude of ultrasonic waves coming through a recording material P and arriving at the reception unit 21b. Accordingly, it is possible to prevent or reduce a noise-to-signal ratio of the received signal from becoming large. Therefore, it is possible to perform detection of the grammage of a recording material P with a higher degree of accuracy than in the conventional method.

Furthermore, the first exemplary embodiment is configured to not only switch voltages to be supplied to the bridge circuit depending on the presence of absence of a recording material P but also switch the operation modes of the bridge circuit according to the switching signal output from the switching instruction unit 20a. However, the amplitude of ultrasonic waves to be emitted toward a recording material P is to be able to be changed depending on the presence of absence of a recording material P, and, for example, a method of performing any one of switching voltages of the bridge circuit and switching the operation modes of the bridge circuit can be employed.

Figure 6:
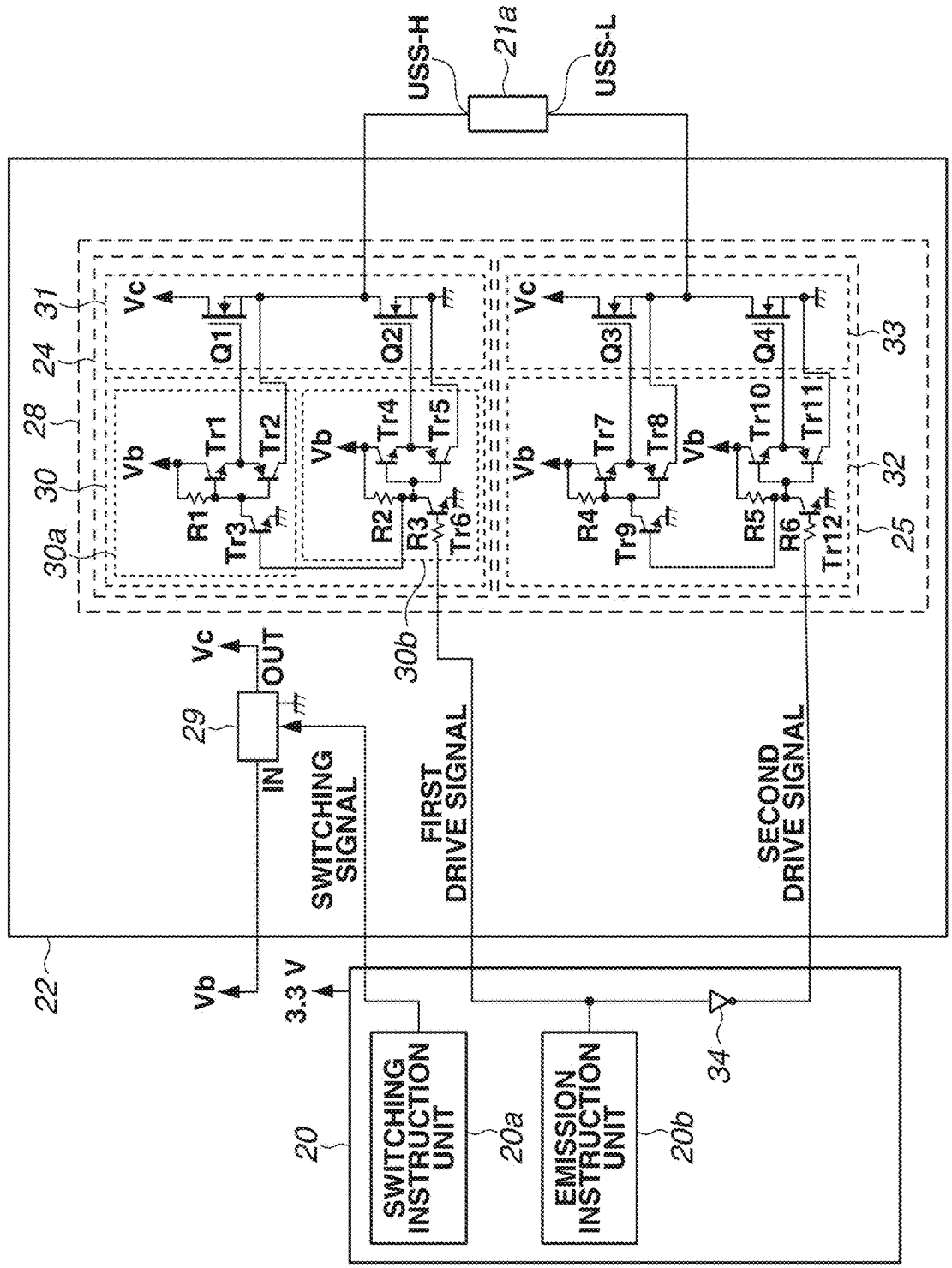
FIG. 6 is an example of an outline configuration diagram of the emission control unit according to the first exemplary embodiment.

A second exemplary embodiment is configured not to include the third output circuit unit 26 as illustrated in FIG. 6 and does not need to perform switching from the full-bridge drive mode to the half-bridge drive mode. Thus, the emission control unit 22 can drive the emission unit 21a always in the full-bridge drive mode with use of the first output circuit unit 24 and the second output circuit unit 25.

In a case where the switching signal is a low signal, when receiving, as an input, burst waves of 2 V from the switching element Q1 of the first output circuit unit 24 via the USS-H terminal, the emission unit 21a receives, as an input, a voltage of 0 V from the switching element Q4 of the second output circuit unit 25. This state is also referred to as a "ninth state". Moreover, when receiving, as an input, a voltage of 0 V from the switching element Q2 of the first output circuit unit 24 via the USS-H terminal, the emission unit 21a receives, as an input, burst waves of 2 V from the switching element Q3 of the second output circuit unit 25. This state is also referred to as a "tenth state".

Moreover, in a case where the switching signal is a high signal, when receiving, as an input, burst waves of 10 V from the switching element Q1 of the first output circuit unit 24 via the USS-H terminal, the emission unit 21a receives, as an input, a voltage of 0 V from the switching element Q4 of the second output circuit unit 25. This state is also referred to as an "eleventh state". Moreover, when receiving, as an input, a voltage of 0 V from the switching element Q2 of the first output circuit unit 24 via the USS-H terminal, the emission unit 21a receives, as an input, burst waves of 10 V from the switching element Q3 of the second output circuit unit 25. This state is also referred to as a "twelfth state".

Furthermore, at this time, while the lower limit of the amplitude of ultrasonic waves which the emission unit 21a emits is an amplitude of ultrasonic waves equivalent to an amplitude obtained in a case where a voltage of 4 V is supplied, the emission unit 21a is able to emit ultrasonic waves having up to an amplitude equivalent to an amplitude obtained in a case where a voltage of 20 V is supplied, as with the first exemplary embodiment.

As described above, while ultrasonic waves which the emission unit 21a emits in the first exemplary embodiment are ultrasonic waves having an amplitude equivalent to an amplitude obtained in a case where a voltage of 2 V to 20 V is supplied, ultrasonic waves which the emission unit 21a emits in the second exemplary embodiment are ultrasonic waves having an amplitude equivalent to an amplitude obtained in a case where a voltage of 4 V to 20 V is supplied. At this time, in the second exemplary embodiment, even if the lower limit of the amplitude of ultrasonic waves which the emission unit 21a emits becomes larger by 2 V, the value of the reception level Va becomes less than or equal to the value of a detected signal which the reception detection unit 23 is able to generate. In this way, in a case where the detection accuracy of a value concerning a grammage is satisfied, even if the lower limit of the amplitude of ultrasonic waves which the emission unit 21a emits is made larger, a beneficial effect similar to that in the first exemplary embodiment can be obtained. Additionally, the second exemplary embodiment enables causing the emission unit 21a to emit ultrasonic waves having an amplitude equivalent to an amplitude obtained in a case where a voltage of 20 V is supplied, without use of the switching unit 27 or the switching unit 40. Therefore, it is possible to reduce the number of components and is thus possible to reduce a manufacturing cost.

Figure 7:
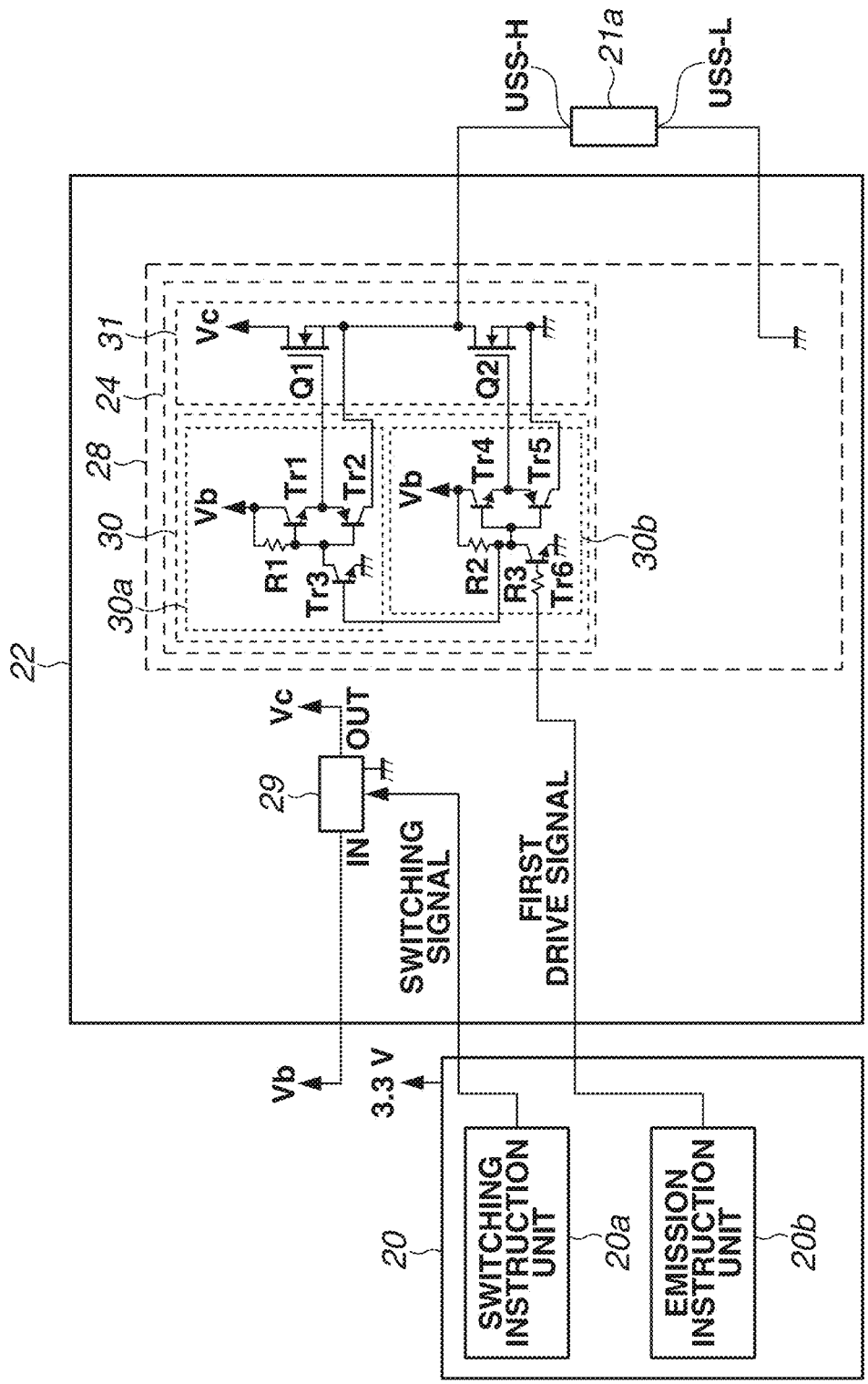
FIG. 7 is an example of an outline configuration diagram of the emission control unit according to the first exemplary embodiment.

Additionally, a third exemplary embodiment is configured not to include the second output circuit unit 25 and the third output circuit unit 26 as illustrated in FIG. 7 and can drive the emission unit 21a in the half-bridge drive mode always with use of the first output circuit unit 24.

In a case where the switching signal output from the switching instruction unit 20a is a low signal, when receiving, as an input, burst waves of 2 V from the switching element Q1 of the first output circuit unit 24 via the USS-H terminal, the emission unit 21a receives, as an input, a voltage of 0 V from ground. This state is also referred to as a "thirteenth state". Moreover, when receiving, as an input, a voltage of 0 V from the switching element Q2 of the first output circuit unit 24 via the USS-H terminal, the emission unit 21a also receives, as an input, a voltage of 0 V from ground. This state is also referred to as a "fourteenth state".

Moreover, in a case where the switching signal output from the switching instruction unit 20a is a high signal, when receiving, as an input, burst waves of 10 V from the switching element Q1 of the first output circuit unit 24 via the USS-H terminal, the emission unit 21a receives, as an input, a voltage of 0 V from ground. This state is also referred to as a "fifteenth state". Moreover, when receiving, as an input, a voltage of 0 V from the switching element Q2 of the first output circuit unit 24 via the USS-H terminal, the emission unit 21a also receives, as an input, a voltage of 0 V from ground. This state is also referred to as a "sixteenth state".

In this case, the lower limit of the amplitude of ultrasonic waves which the emission unit 21a emits is an amplitude of ultrasonic waves equivalent to an amplitude obtained in a case where a voltage of 2 V is supplied, and the upper limit of the amplitude of ultrasonic waves which the emission unit 21a emits is an amplitude of ultrasonic waves equivalent to an amplitude obtained in a case where a voltage of 10 V is supplied.

As described above, while ultrasonic waves which the emission unit 21a emits in the first exemplary embodiment are ultrasonic waves having an amplitude equivalent to an amplitude obtained in a case where a voltage of 2 V to 20 V is supplied, ultrasonic waves which the emission unit 21a emits in the third exemplary embodiment are ultrasonic waves having an amplitude equivalent to an amplitude obtained in a case where a voltage of 2 V to 10 V is supplied. At this time, even if the upper limit of the amplitude of ultrasonic waves which the emission unit 21a emits becomes smaller by 10 V, in a case where the detection accuracy of a value concerning a grammage is satisfied, a beneficial effect similar to that in the first exemplary embodiment can be obtained. Additionally, the third exemplary embodiment enables causing the emission unit 21a to emit ultrasonic waves having an amplitude equivalent to an amplitude obtained in a case where a voltage of 10 V is supplied, without use of the second output circuit unit 25, the third output circuit unit 26, and the switching unit 27 or the switching unit 40. Therefore, it is possible to reduce the number of components and is thus possible to reduce a manufacturing cost.

Furthermore, in the first to third exemplary embodiments, a case where the emission unit 21a emits ultrasonic waves with a frequency of 40 kHz according to an output of the emission circuit unit 28 and the drive voltage to be supplied to the emission unit 21a is switched depending on the presence or absence of a recording material P has been described. However, to prevent or reduce the noise-to-signal ratio of the received signal from becoming large, a configuration in which the drive voltage is made constant irrespective of the presence or absence of a recording material P and the frequency of a drive signal to be output from the emission instruction unit 20b is switched depending on the presence or absence of a recording material P can be employed. For example, the frequency of a drive signal according to which the amplitude of ultrasonic waves becomes maximum is assumed to be a first frequency, and the frequency of a drive signal according to which the amplitude of ultrasonic waves becomes smaller than the amplitude of ultrasonic waves obtained when the drive signal has the first frequency is assumed to be a second frequency. In this case, when the reception unit 21b receives ultrasonic waves coming through a recording material P, the emission instruction unit 20b outputs pulse waves having the first frequency as the drive signal. Moreover, when the reception unit 21b receives ultrasonic waves coming not through a recording material P, the emission instruction unit 20b outputs pulse waves having the second frequency as the drive signal. This enables the emission unit 21a to output ultrasonic waves larger in amplitude in a case where the reception unit 21b receives ultrasonic waves coming through a recording material P than in a case where the reception unit 21b receives ultrasonic waves coming not through a recording material P. Accordingly, it is possible to prevent or reduce the noise-to-signal ratio from becoming large due to the received signal being amplified in a case where the reception unit 21b receives ultrasonic waves coming through a recording material P. Therefore, it becomes possible to perform detection of the grammage of a recording material P with a higher degree of accuracy than in the conventional method.

Moreover, a configuration in which the drive voltage and the frequency of a drive signal to be output from the emission instruction unit 20b are made constant irrespective of the presence or absence of a recording material P and a duty ratio between a high signal and a low signal in the drive signal is switched depending on the presence or absence of a recording material P can be employed. This enables the emission unit 21a to output ultrasonic waves larger in amplitude in a case where the reception unit 21b receives ultrasonic waves coming through a recording material P than in a case where the reception unit 21b receives ultrasonic waves coming not through a recording material P. Accordingly, it is possible to prevent or reduce the noise-to-signal ratio from becoming large due to the received signal being amplified in a case where the reception unit 21b receives ultrasonic waves coming through a recording material P.

In the above-described first to third exemplary embodiments, in a case where, in the reception detection unit 23, the amplification rate of a received signal is not adjusted, a drive voltage to be supplied to the emission unit 21a is switched depending on the presence or absence of a recording material P. Thus, in a case where the reception unit 21b receives ultrasonic waves coming through a recording material P, a drive signal larger than in a case where the reception unit 21b receives ultrasonic waves coming not through a recording material P is supplied to the emission unit 21a, so that a received signal with a large amplitude is obtained. Accordingly, in a case where the reception unit 21b receives ultrasonic waves coming through a recording material P, an increase of the noise-to-signal ratio due to the amplification rate of a received signal of ultrasonic waves attenuated by a recording material P being increased is prevented or reduced. A fourth exemplary embodiment is configured not to include the switching instruction unit 20a and is configured to supply a drive voltage of 10 V to the emission unit 21a irrespective of the presence or absence of a recording material P. Then, as with the second exemplary embodiment, the emission control unit 22 drives the emission unit 21a always in the full-bridge drive mode with use of the first output circuit unit 24 and the second output circuit unit 25, thus enabling emitting ultrasonic waves having up to an amplitude equivalent to an amplitude obtained in a case where a voltage of 20 V is supplied, irrespective of the presence or absence of a recording material P. Then, in a case where the reception unit 21b receives ultrasonic waves coming not through a recording material P, the reception detection unit 23 makes the amplitude of a received signal generated by the reception unit 21b smaller, so that a reception level able to be detected by the reception level detection unit 20c is obtained.

[Switching of Amplification Rate of Ultrasonic Waves Depending on Presence or Absence of Recording Material P in Reception Detection Unit 23]

Figure 11:
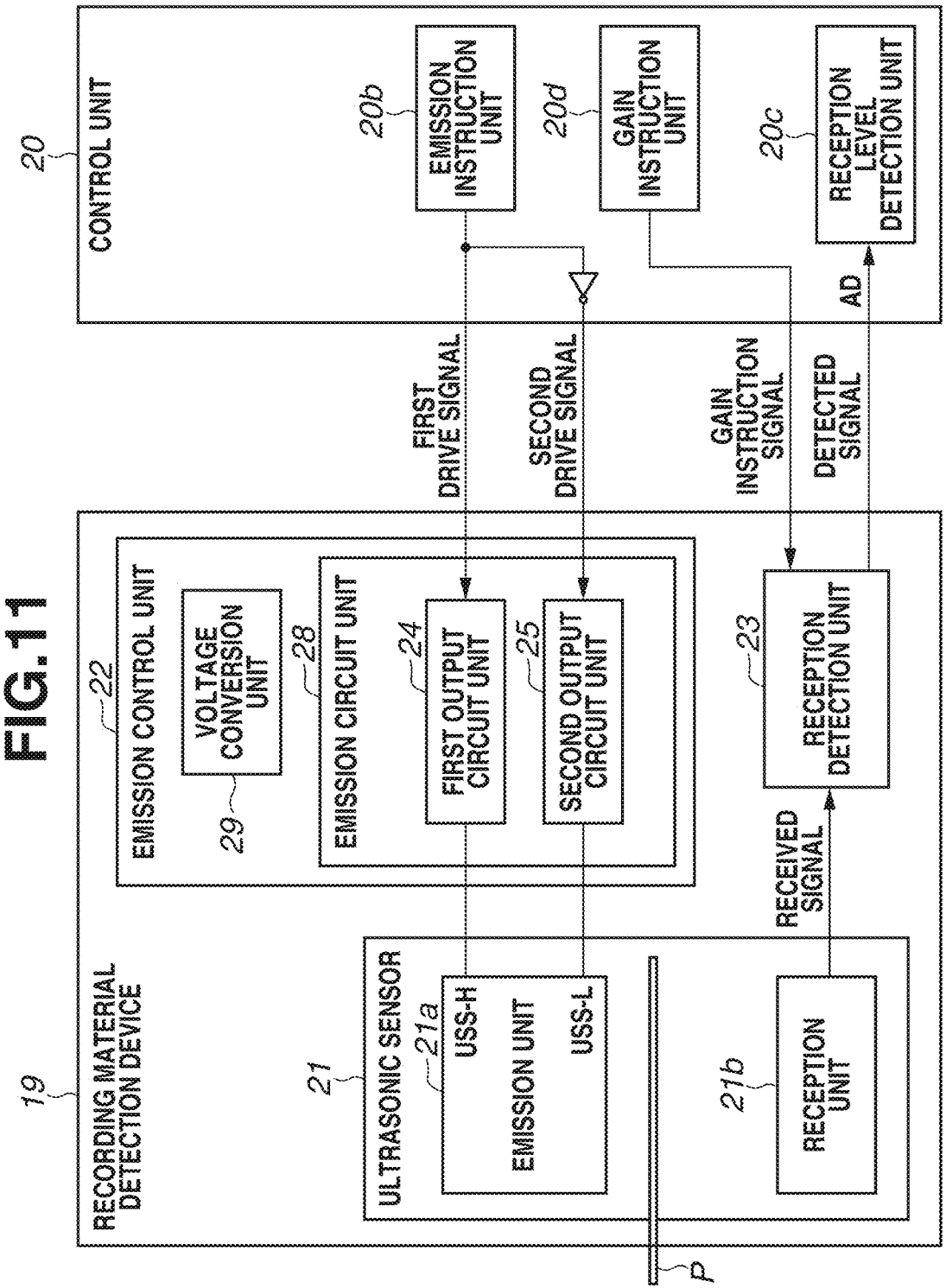
FIG. 11 is a control block diagram for a recording material detection device according to a fourth exemplary embodiment.

FIG. 11 is a control block diagram for the recording material detection device 19 according to the fourth exemplary embodiment. Furthermore, in the following description, the same components as those illustrated in FIG. 2 are assigned the respective same reference numerals and are omitted from description here.

The control unit 20 further includes a gain instruction unit 20d, which is provided to control an amplification rate to be used by the reception detection unit 23. As mentioned above, the reception detection unit 23 is a circuit unit which has the function of amplifying the amplitude of a received signal output from the reception unit 21b and thus performing half-wave rectification thereof. The reception detection unit 23 switches the amplification rate of the received signal output from the reception unit 21b, according to a gain instruction signal output from the gain instruction unit 20d. In the following description, switching of the amplification rate of the received signal output from the reception unit 21b performed by the reception detection unit 23 is described with reference to an inverting amplifier circuit using an operational amplifier. Furthermore, in the fourth exemplary embodiment, an inverting amplifier circuit is used, but can be replaced by a circuit capable of amplifying a signal, such as an amplifier circuit using a transistor.

The inverting amplifier circuit is a circuit in which the amplification rate to be used is determined by a ratio between the resistance value of an input portion connected to a minus terminal and the resistance value of a feedback portion located between the minus terminal and an output terminal. Therefore, the inverting amplifier circuit is able to change the amplification rate by changing over the resistance value of the input portion or the resistance value of the feedback portion with a switch. Furthermore, in the fourth exemplary embodiment, the reception detection unit 23 switches the amplification rate to any one of $1/10$ times and one time according to the gain instruction signal output from the gain instruction unit 20d. The reception detection unit 23 sets the amplification rate to $1/10$ times in response to the gain instruction signal being a low signal and sets the amplification rate to one time in response to the gain instruction signal being a high signal. Furthermore, in the fourth exemplary embodiment, a received signal obtained by the reception unit 21b receiving ultrasonic waves coming not through a recording material P is also referred to as a "first received value", and a received signal obtained by the reception unit 21b receiving ultrasonic waves coming through a recording material P is also referred to as a "second received value". Moreover, the gain instruction unit 20d is also referred to as an "amplification rate switching instruction unit", and the gain instruction signal output from the gain instruction unit 20d is also referred to as an "amplification rate switching signal". Moreover, a low signal out of the gain instruction signal is also referred to as a "first amplification rate switching signal", an amplification rate set to $1/10$ times is also referred to as a "first amplification rate", and a detected signal obtained by amplifying the received signal at the first amplification rate is also referred to as a "first converted value". Moreover, a high signal out of the gain instruction signal is also referred to as a "second amplification rate switching signal", an amplification rate set to one time is also referred to as a "second amplification rate", and a detected signal obtained by amplifying the received signal at the second amplification rate is also referred to as a "second converted value". Furthermore, in the fourth exemplary embodiment, the amplification rate is assumed to be switched to any one of $1/10$ times and one time, but is not limited to this amplification rate. An amplification rate to be used in the case of the reception unit 21b receiving ultrasonic waves coming not through a recording material P can be, for example, $1/20$ times and is to be an amplification rate available for making the received signal smaller. Moreover, an amplification rate to be used in the case of the reception unit 21b receiving ultrasonic waves coming through a recording material P is to be an amplification rate available for satisfying the accuracy of a value used for grammage detection.

Next, in the following description, setting of the amplification rate performed by the reception detection unit 23 is described. In a case where the reception unit 21b receives ultrasonic waves coming through a recording material P, the amplitude of a received signal to be input to the reception detection unit 23 becomes smaller. Therefore, to set the amplification rate to be used by the reception detection unit 23 to one time, the gain instruction unit 20d outputs a high signal as the gain instruction signal. Moreover, in a case where the reception unit 21b receives ultrasonic waves coming not through a recording material P, the amplitude of a received signal to be input to the reception detection unit 23 becomes larger. Therefore, when the received signal is amplified and subjected to half-wave rectification by the reception detection unit 23, it is desirable to prevent or reduce the received signal from exceeding the amplitude of a range to be subjected to half-wave rectification by the reception detection unit 23 (in the following description, also referred to as "becoming saturated"). Therefore, the gain instruction unit 20d outputs a low signal as the gain instruction signal to set the amplification rate to $1/10$ times as a multiplying factor smaller than that in the case of the gain instruction signal being a high signal.

As described above, in the fourth exemplary embodiment, in a case where the reception unit 21b receives ultrasonic waves coming not through a recording material P, the gain instruction unit 20d outputs a low signal, and in a case where the reception unit 21b receives ultrasonic waves coming through a recording material P, the gain instruction unit 20d outputs a high signal.

<Method of Switching Amplification Rate of Received Signal by Reception Detection Unit 23 Depending on Presence of Absence of Recording Material P>

In the following description, a method of switching the amplification rate of a received signal to be used by the reception detection unit 23, by the gain instruction unit 20d switching the gain instruction signal depending on the presence or absence of a recording material P is described with reference to FIG. 12 and FIGS. 13A, 13B, 13C, 13D, 13E, 13F, 13G, and 13H. FIG. 12 is a flowchart of processing for calculating a detected value of the grammage of a recording material P according to the fourth exemplary embodiment. FIGS. 13A to 13H are timing diagrams illustrating, for example, states of signals and states of voltages concerning the processing for calculating a detected value of the grammage, which the recording material detection device 19 performs according to the fourth exemplary embodiment. Furthermore, the same components as those illustrated in FIG. 8 and FIGS. 9A to 9H are assigned the respective same reference characters and are omitted from description here. Portions with the same reference numerals assigned perform the respective same functions and operations and are omitted from description here.

In step S100, in response to receiving a printing instruction, the control unit 20 starts a paper feeding operation.

In step S301, as illustrated in FIG. 13B, the gain instruction unit 20d outputs a low signal as the gain switching signal to the reception detection unit 23. The voltage conversion unit 29 causes the first output circuit unit 24 to output a voltage Vc of 10 V, so that the emission unit 21a is driven in the full-bridge drive mode. Therefore, the gain instruction unit 20d outputs a low signal as the gain instruction signal to the reception detection unit 23, so that the amplification rate of a received signal is set to $1/10$ times by the reception detection unit 23.

In step S302, the control unit 20 performs the following processing at timing at which, after the start of the paper feeding operation, a recording material P has not yet arrived at the ultrasonic sensor 21. Thus, as illustrated in FIG. 13A, the control unit 20 starts measuring the reception level of ultrasonic waves via the reception unit 21b obtained in a case where the reception unit 21b receives ultrasonic waves coming not through a recording material P. At this time, the emission circuit unit 28 drives the emission unit 21a in the half-bridge drive mode. Thus, as illustrated in FIG. 13F, a voltage of 10 V and a voltage of 0 V are alternately input from the first output circuit unit 24 to the USS-H terminal, and, as illustrated in FIG. 13G, a voltage of 10 V and a voltage of 0 V are alternately input from the second output circuit unit 25 to the USS-L terminal.

In step S103, the reception detection unit 23 generates a detected signal, such as that illustrated in FIG. 13H, based on a received signal obtained by the reception unit 21b during a period until a predetermined time elapses from the start of measurement of the reception level of the received signal, thus calculating a reception level Va. At this time, the detected signal generated by the reception detection unit 23 is converted by the reception detection unit 23 into waveforms having a peak value at intervals of the half wavelength of 40 kHz, which is the same as the frequency of ultrasonic waves emitted from the emission unit 21a. Moreover, at this time, even if the number of pulses of the first drive signal is two as illustrated in FIG. 13D, the number of waveforms of the detected signal such as that illustrated in FIG. 13H becomes a number exceeding two. This is because there is a reverberation in the emission unit 21a or the reception unit 21b. The control unit 20 detects the second waveform of the detected signal obtained by the reception level detection unit 20c performing conversion and then calculates a peak value of the second waveform. At this time, the control unit 20 calculates a peak value of the second waveform by detecting a detected signal obtained during a given predetermined time synchronized with the first drive signal. The predetermined time as used herein is set by previously performing calculation based on a relationship between the distance between the emission unit 21a and the reception unit 21b and the sound speed of ultrasonic waves. Furthermore, in the fourth exemplary embodiment, the control unit 20 starts a paper feeding operation in step S100, but can be configured to start a paper feeding operation after the reception level Va has been calculated by the reception detection unit 23.

In step S303, as illustrated in FIG. 13B, the gain instruction unit 20d outputs a high signal as the gain switching signal to the reception detection unit 23, thus causing the reception detection unit 23 to set the amplification rate of a received signal to one time.

The subsequent processing operations are the same as those illustrated in FIG. 8 and are, therefore, omitted from description.

As described above, the fourth exemplary embodiment is configured not to include the switching instruction unit 20a and is configured to supply a drive voltage of 10 V to the emission unit 21a irrespective of the presence or absence of a recording material P. Then, as with the second exemplary embodiment, the emission control unit 22 drives the emission unit 21a always in the full-bridge drive mode with use of the first output circuit unit 24 and the second output circuit unit 25, thus enabling emitting ultrasonic waves having up to an amplitude equivalent to an amplitude obtained in a case where a voltage of 20 V is supplied, irrespective of the presence or absence of a recording material P. Then, in a case where the reception unit 21b receives ultrasonic waves coming not through a recording material P, the reception detection unit 23 makes the amplitude of a received signal generated by the reception unit 21b smaller, so that a reception level able to be detected by the reception level detection unit 20c is obtained. In this way, depending on the presence or absence of a recording material P, the reception detection unit 23 switches the amplification rate of a received signal and thus adjusts the magnitude of the amplitude of the received signal, so that it is possible to prevent or reduce a noise-to-signal ratio of the received signal from becoming large. Furthermore, in the fourth exemplary embodiment, a configuration which improves a noise-to-signal ratio of the received signal by optimizing an amplification rate to be used by the reception detection unit 23, in addition to the operations described in the second exemplary embodiment, has been described. However, in the case of, without the switching instruction unit 20a, supplying a drive voltage of 10 V to the emission unit 21a irrespective of the presence of absence of a recording material P, such a configuration can be applied to a combination of the fourth exemplary embodiment and the first exemplary embodiment or the third exemplary embodiment.

In the fourth exemplary embodiment the following method has been described. First, without the switching instruction unit 20a, the method supplies a drive voltage of 10 V to the emission unit 21a irrespective of the presence of absence of a recording material P. Then, as with the second exemplary embodiment, the method drives the emission unit 21a always in the full-bridge drive mode with use of the first output circuit unit 24 and the second output circuit unit 25, thus enabling emitting ultrasonic waves having up to an amplitude equivalent to an amplitude obtained in a case where a voltage of 20 V is supplied, irrespective of the presence or absence of a recording material P. Then, in a case where the reception unit 21b receives ultrasonic waves coming not through a recording material P, the method causes the reception detection unit 23 to make the amplitude of a received signal generated by the reception unit 21b smaller, so that a reception level able to be detected by the reception level detection unit 20c is obtained.

As with the fourth exemplary embodiment, a modification example of the fourth exemplary embodiment is configured not to include the switching instruction unit 20a and is configured to supply a drive voltage of 10 V to the emission circuit unit 28 irrespective of the presence or absence of a recording material P. Then, as with the second exemplary embodiment, the emission control unit 22 drives the emission unit 21a always in the full-bridge drive mode with use of the first output circuit unit 24 and the second output circuit unit 25, thus enabling emitting ultrasonic waves having up to an amplitude equivalent to an amplitude obtained in a case where a voltage of 20 V is supplied, irrespective of the presence or absence of a recording material P. Then, in the modification example of the fourth exemplary embodiment, the control unit 20 further includes a gain instruction unit 20e, and the emission circuit unit 28 includes a first amplification rate switching unit (not illustrated) and a second amplification rate switching unit (not illustrated). Then, in a case where the reception unit 21b receives ultrasonic waves coming not through a recording material P, the first amplification rate switching unit and the second amplification rate switching unit set the amplification rate of a voltage input to the emission circuit unit 28 to, for example, ⅕ times, so that a drive voltage to be input to the emission unit 21a is made smaller.

[Switching of Amplification Rate of Drive Voltage Depending on Presence or Absence of Recording Material P in Emission Control Unit 22]

FIG. 14 is a control block diagram for the recording material detection device 19 according to the modification example of the fourth exemplary embodiment. Furthermore, in the following description, the same components as those illustrated in FIG. 11 are assigned the respective same reference characters and are omitted from description here.

The control unit 20 includes the gain instruction unit 20e, which controls the amplification rate of a voltage input to the emission circuit unit 28. The first amplification rate switching unit and the second amplification rate switching unit included in the emission circuit unit 28 switch the amplification rate of a voltage input to the emission circuit unit 28 according to a gain instruction signal output from the gain instruction unit 20e. Furthermore, in the modification example of the fourth exemplary embodiment, respective voltage values obtained by the first amplification rate switching unit and the second amplification rate switching unit are assumed to be the same voltage value. Moreover, in the modification example of the fourth exemplary embodiment, switching of the amplification rate is performed with an inverting amplifier circuit using an operational amplifier, which is the same configuration as that in the fourth exemplary embodiment, and is, therefore, omitted from description. Furthermore, in the modification example of the fourth exemplary embodiment, an inverting amplifier circuit is used, but can be replaced by a circuit capable of amplifying a signal, such as an amplifier circuit using a transistor.

Next, in the following description, setting of the amplification rate performed by the first amplification rate switching unit and the second amplification rate switching unit is described. In a case where the reception unit 21b receives ultrasonic waves coming through a recording material P, the amplitude of a received signal to be input to the reception detection unit 23 becomes small. Therefore, the amplitude of ultrasonic waves emitted from the emission unit 21a are to be a large amplitude. Therefore, to set the amplification rate in the first amplification rate switching unit and the second amplification rate switching unit to one time, the gain instruction unit 20e outputs a high signal as the gain instruction signal. Moreover, in a case where the reception unit 21b receives ultrasonic waves coming not through a recording material P, the amplitude of a received signal to be input to the reception detection unit 23 becomes large. In one embodiment, the amplitude of ultrasonic waves emitted from the emission unit 21a is to be a small amplitude. Therefore, the gain instruction unit 20e outputs a low signal as the gain instruction signal to set the amplification rate in the first amplification rate switching unit and the second amplification rate switching unit to ⅕ times as a multiplying factor smaller than that in the case of the gain instruction signal being a high signal.

As described above, in the modification example of the fourth exemplary embodiment, the gain instruction unit 20e outputs a low signal in a case where the reception unit 21b receives ultrasonic waves coming not through a recording material P and outputs a high signal in a case where the reception unit 21b receives ultrasonic waves coming through a recording material P.

In this way, depending on the presence or absence of a recording material P, the first amplification rate switching unit and the second amplification rate switching unit switch the amplification rate of a voltage input to the emission circuit unit 28, thus preventing or reducing a noise-to-signal ratio of the received signal from becoming large.

Furthermore, in the modification example of the fourth exemplary embodiment, a received signal obtained by the reception unit 21b receiving ultrasonic waves coming not through a recording material P is also referred to as a "first received value", and a received signal obtained by the reception unit 21b receiving ultrasonic waves coming through a recording material P is also referred to as a "second received value". Moreover, the gain instruction unit 20e is also referred to as an "amplification rate switching instruction unit", and a gain instruction signal output from the gain instruction unit 20e is also referred to as an "amplification rate switching signal". Moreover, a low signal out of the gain instruction signal is also referred to as a "first amplification rate switching signal", an amplification rate set to ⅕ times is also referred to as a "first amplification rate", and a voltage obtained by converting the voltage input to the emission circuit unit 28 at the first amplification rate is also referred to as a "first converted input value". Moreover, a combination of the first amplification rate switching unit and the second amplification rate switching unit is also referred to as an "amplification rate switching unit". Additionally, a high signal out of the gain instruction signal is also referred to as a "second amplification rate switching signal", an amplification rate set to one time is also referred to as a "second amplification rate", and a voltage obtained by converting the voltage input to the emission circuit unit 28 at the second amplification rate is also referred to as a "second converted input value".

As described above, according to aspects of the embodiments, controlling a voltage to be supplied to the emission unit 21a enables preventing or reducing a decrease in the detection accuracy of information concerning the grammage of a recording material P.

[Recording Material Detection Device 119]

FIG. 15 is a control block diagram for a recording material detection device 119 according to a fifth exemplary embodiment.

The recording material detection device 119 includes an ultrasonic sensor 121, an emission circuit unit 122, and a reception detection unit 123, and is controlled by a control unit 120.

The ultrasonic sensor 121 is a sensor which detects the grammage of a recording material P with use of ultrasonic waves, and includes an emission unit 121a, which emits ultrasonic waves, and a reception unit 121b, which receives ultrasonic waves. Furthermore, the ultrasonic sensor 121 is also referred to as an "ultrasonic emission device".

The control unit 120 includes the functions of an emission instruction unit 120a, an amplification rate switching instruction unit 120b, a reception level detection unit 120c, and a peak detection unit 120d, which are configured to control the recording material detection device 119. The emission instruction unit 120a outputs a drive signal to the recording material detection device 119, thus controlling an output signal to be output from the emission unit 121a. Moreover, the emission instruction unit 120a switches a drive voltage to be supplied to the recording material detection device 119, thus switching the amplitude of an output signal to be output from the emission circuit unit 122. Furthermore, the emission instruction unit 120a can include a drive input switching unit which switches a frequency of the drive signal or the drive voltage depending on the presence or absence of a recording material P. However, in the fifth exemplary embodiment, the drive voltage is assumed to be constant irrespective of the presence or absence of a recording material P. At this time, a drive signal to be generated by the emission instruction unit 120a is a burst signal of pulse waves with a fixed period, and an output signal obtained by the emission circuit unit 122 switching the amplitude of the burst signal to a given amplitude causes the emission unit 121a to emit ultrasonic waves.

An output terminal of the emission circuit unit 122 is connected to a USS terminal of the emission unit 121a. The emission unit 121a emits ultrasonic waves with a frequency of 40 kHz according to an output of the emission circuit unit 122. The reception unit 121b receives ultrasonic waves emitted from the emission unit 121a, and outputs a received signal corresponding to the amplitude of the received ultrasonic waves to the reception detection unit 123. Furthermore, in the fifth exemplary embodiment, the frequency of ultrasonic waves is set to 40 kHz, but is to be a frequency available for detecting a characteristic value of the grammage of a recording material P and can be set according to characteristic features of elements. Moreover, the emission unit 121a and the reception unit 121b are arranged near a conveyance path through which to convey a recording material P in such a way as to be opposite each other across the conveyance path to enable ultrasonic waves coming through a recording material P to be received.

Furthermore, when the reception unit 121b receives ultrasonic waves coming not through a recording material P, the maximum amplitude of amplitudes of ultrasonic waves emitted by the emission unit 121a is also referred to as a "first maximum amplitude". Moreover, a drive voltage and a drive signal for causing the emission circuit unit 122 to output a first output signal to the emission unit 121a to emit ultrasonic waves with the first maximum amplitude are also referred to as a "first drive input". Moreover, when the reception unit 121*b* receives ultrasonic waves coming through a recording material P, the maximum amplitude of amplitudes of ultrasonic waves emitted by the emission unit 121*a* is also referred to as a "second maximum amplitude". Moreover, a drive voltage and a drive signal for causing the emission circuit unit 122 to output a second output signal to the emission unit 121*a* to emit ultrasonic waves with the second maximum amplitude are also referred to as a "second drive input".

The reception detection unit 123 is a circuit unit which has the function of amplifying the amplitude of a received signal obtained by the reception unit 121*b* receiving ultrasonic waves coming through a recording material P in response to the amplification rate switching instruction unit 120*b* and thus performing half-wave rectification thereof. Furthermore, in the fifth exemplary embodiment, the reception detection unit 123 is also referred to as a "reception detection unit". The amplification rate switching instruction unit 120*b* switches the amplification rate of the amplitude of a receiving signal depending on the presence or absence of a recording material P. For example, in a case where the reception unit 121*b* receives ultrasonic waves coming not through a recording material P, the amplification rate switching instruction unit 120*b* sets the amplification rate to one time, so that a detected signal is input, without being amplified, to the reception level detection unit 120*c*. Moreover, in a case where the reception unit 121*b* receives ultrasonic waves coming through a recording material P, the amplification rate switching instruction unit 120*b* sets the amplification rate to a previously set amplification rate for the received signal, so that a detected signal obtained by amplification is input to the reception level detection unit 120*c*.

A detected signal generated by the reception detection unit 123 is input to an analog-to-digital (AD) port of the control unit 120 and is thus converted from an analog signal into a digital signal by the reception level detection unit 120*c*. The control unit 120 detects the waveform of the detected signal based on the digital signal obtained by the reception level detection unit 120*c* performing conversion, and calculates a peak value (maximum value) thereof as a reception level of ultrasonic waves. Moreover, the peak detection unit 120*d* detects the waveform of the detected signal based on the digital signal obtained by the reception level detection unit 120*c* performing conversion, and selects a waveform for detecting the peak value. In the fifth exemplary embodiment, in a case where the reception unit 121*b* receives ultrasonic waves coming not through a recording material P, the peak detection unit 120*d* selects the first wave of the detected signal as a waveform for detecting the peak value as a peak detected signal. Moreover, in a case where the reception unit 121*b* receives ultrasonic waves coming through a recording material P, the peak detection unit 120*d* selects a waveform obtained a predetermined time after inputting of the drive signal as a waveform for detecting the peak value as a peak detected signal.

Furthermore, while, in the fifth exemplary embodiment, in a case where the reception unit 121*b* receives ultrasonic waves coming not through a recording material P, the peak detection unit 120*d* is configured to select the first wave of the detected signal as a waveform for detecting the peak value as a peak detected signal, the peak detection unit 120*d* does not necessarily need to select the first wave. A waveform to be selected for detecting the peak value as a peak detected signal in a case where the reception unit 121*b* receives ultrasonic waves coming not through a recording material P can be any wave as long as it is a wave in which the reception level of the detected signal is not saturated and which is available for detecting the peak value. Furthermore, the reception level being saturated refers to a detected signal obtained and output by the reception detection unit 123 detecting the input received signal reaching the upper limit of a detectable detected signal.

At this time, the value of the detected signal serving as the upper limit is also referred to as a "first value". The first value is the maximum value of the amplitudes of waves to be output from reception detection unit 123, and the reception detection unit 123 outputs a detected signal of waves with amplitude lower than or equal to the first value. Moreover, in the fifth exemplary embodiment, in a case where the reception unit 121*b* receives ultrasonic waves coming through a recording material P, the peak detection unit 120*d* is configured to select a waveform obtained a predetermined time after inputting of the drive signal as a waveform for detecting the peak value as a peak detected signal. However, the peak detection unit 120*d* does not necessarily need to select a waveform obtained a predetermined time after. Moreover, in the fifth exemplary embodiment, a peak value to be obtained in a case where the reception unit 121*b* receives ultrasonic waves coming through a recording material P is to be set larger than a peak value to be obtained in a case where the reception unit 121*b* receives ultrasonic waves coming not through a recording material P, and a method for such setting is not limited. Furthermore, the predetermined time as used herein is assumed to be a time calculated from a relationship between a distance between the emission unit 121*a* and the reception unit 121*b* previously measured in the manufacturing process and a sound speed of ultrasonic waves previously detected by an ultrasonic sensor in the manufacturing process. Moreover, in the fifth exemplary embodiment, the calculation of a reception level uses a peak value included in a detected signal output from the reception detection unit 123, but is to use a characteristic value available for determining the level of a received signal, such as an effective value or an average value. Furthermore, the reception detection unit 123 is also referred to as a "reception detection unit".

Furthermore, in the fifth exemplary embodiment, a reception level obtained in a case where the reception unit 121*b* receives ultrasonic waves coming not through a recording material P is denoted by Va1, and a reception level obtained in a case where the reception unit 121*b* receives ultrasonic waves coming through a recording material P is denoted by Vp3. Moreover, the control unit 120 performs calculation of the grammage of a recording material P with use of the reception levels Va1 and Vp3.

<Correction of Positional Variation Between Reception Unit 121*b* and Emission Unit 121*a*>

Next, the correction of a positional variation between the reception unit 121*b* and the emission unit 121*a*, which is required to perform paper type discrimination, is described.

In a manufacturing process for the image forming apparatus 1, at the time of attachment of the ultrasonic sensor 121 to the image forming apparatus 1, a positional relationship between the reception unit 121*b* and the emission unit 121*a* with respect to a recording material P targeted for detection may vary. Such a positional variation may cause a time in which ultrasonic waves arrive at the reception unit 121*b* to vary and may also cause a time in which a reception level detected by the reception level detection unit 120*c* becomes a peak value to vary. Therefore, calculating a correction coefficient as described below is employed to enable detecting a grammage with a positional variation corrected.

In a case where the reception unit 121b receives ultrasonic waves coming not through a recording material P, a reception level output from the reception level detection unit 120c is denoted by Va1. Moreover, in a case where the reception unit 121b receives ultrasonic waves coming through a recording material P, a reception level output from the reception level detection unit 120c is denoted by Vp3. A position correction coefficient T is calculated with use of the reception level Va1 and the reception level Vp3 as in the following equation (2). Furthermore, in the fifth exemplary embodiment, the reception level Va1 is also referred to as "amplitude information about a first wave", and the reception level Vp3 is also referred to as "amplitude information about a second wave".

$$T = Vp3/Va1 \qquad (2)$$

Figure 16:
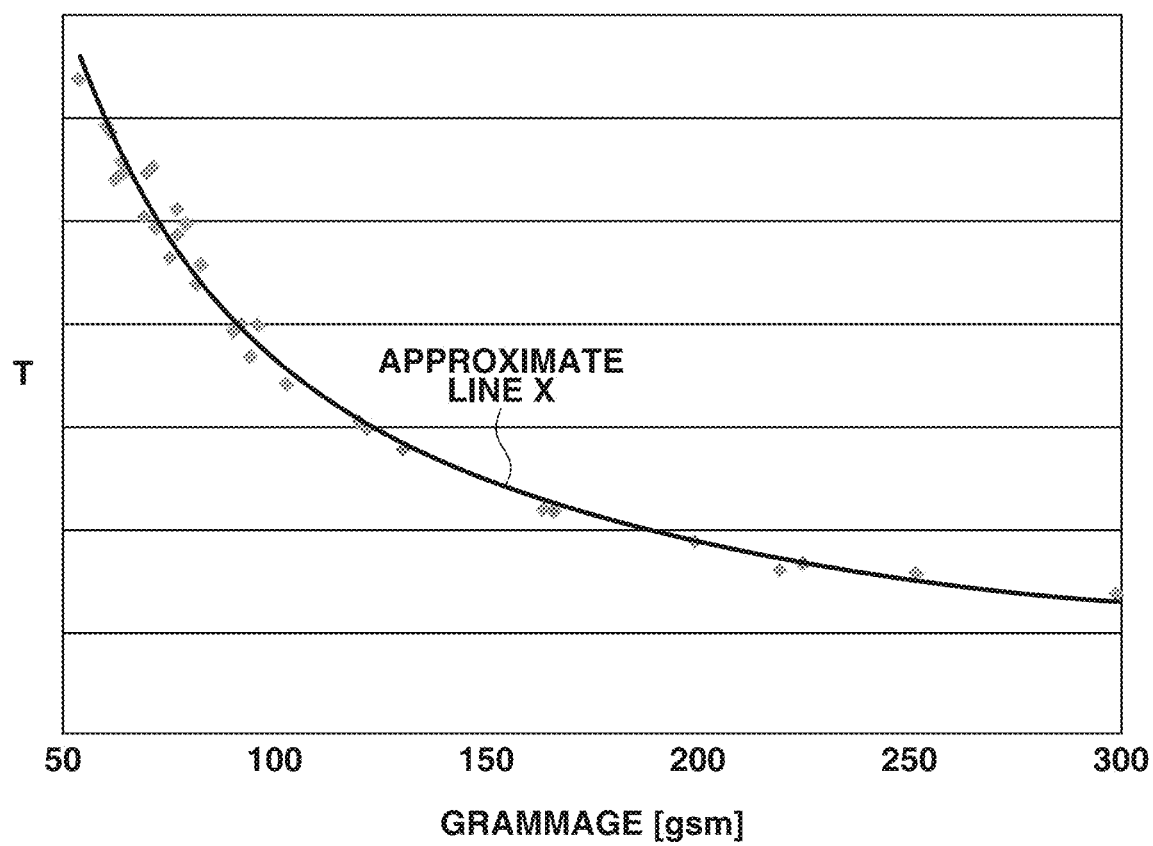
FIG. 16 is a graph showing an approximate expression obtained by plotting a relationship between a position correction coefficient and the grammage of a recording material.

The control unit 120 calculates a grammage by using a graph representing an approximate expression obtained by plotting a relationship between the position correction coefficient T and the value of the grammage of a recording material P as illustrated in FIG. 16. Then, the control unit 120 determines the paper type of a recording material P based on the calculated grammage, determines an image forming condition corresponding to the type of a recording material P, and controls an operation of the image forming apparatus 1 according to the image forming condition. The approximate expression as used herein is previously obtained from actual grammages and correction coefficients T and is stored in a non-volatile memory of the control unit 120. While, in the fifth exemplary embodiment, an approximate expression is used, a conversion table representing a relationship between the position correction coefficient T and the value of the grammage of a recording material P can be used.

<Attenuation of Ultrasonic Waves by Recording Material P and Discrimination Method for Paper Type>

In the following description, the attenuation of ultrasonic waves by a recording material P is described. The amount of attenuation of ultrasonic waves transmitted through a recording material P becomes larger in proportion to the grammage of a recording material P. Thus, since, as the grammage of a recording material P increases, the amount of attenuation of ultrasonic waves becomes larger, the value of the reception level Vp3 becomes smaller. In a case where the recording material P is thin paper, which is small in grammage, since the amount of attenuation of ultrasonic waves is smaller than that for plain paper, the value of the reception level Vp3 becomes larger than that for plain paper. On the other hand, in a case where the recording material P is heavy paper, which is large in grammage, since the amount of attenuation of ultrasonic waves is greater than that for plain paper, the value of the reception level Vp3 becomes smaller than that for plain paper. Thus, in a case where the value of the reception level Vp3 becomes larger, the value of the position correction coefficient T also becomes larger.

For example, the control unit 120 obtains a grammage corresponding to the value of the position correction coefficient T with use of an approximate line X illustrated in FIG. 16. In a case where the grammage obtained by the control unit 120 is smaller than a given threshold value, the control unit 120 determines that the paper type of a recording material P is thin paper. Moreover, in a case where the grammage obtained by the control unit 120 is larger than the given threshold value, the control unit 20 determines that the paper type of a recording material P is heavy paper. The given threshold value as used herein is a value based on which it is determined that, for example, as illustrated in FIG. 16, if the grammage is less than or equal to 59 g/m$^2$, the paper type is thin paper, if the grammage is 60 g/m$^2$ to 90 g/m$^2$, the paper type is plain paper, and, if the grammage is greater than 90 g/m$^2$, the paper type is heavy paper. Furthermore, the discrimination method for the paper type is not limited to this, and a relationship between the grammage and the paper type can be previously stored in a non-volatile memory and information about the stored relationship can be used for discrimination.

<Reason to Switch Waveform Available for Detecting Peak Value Depending on Presence or Absence of Recording Material P>

Next, in the fifth exemplary embodiment, the reason to switch a waveform available for detecting a peak value depending on the presence or absence of a recording material P is described.

First, the case of detecting peak values of waveforms obtained at the same timing between in a case where the reception unit 121b receives ultrasonic waves coming not through a recording material P and in a case where the reception unit 121b receives ultrasonic waves coming through a recording material P is described with reference to FIG. 17A. In the example illustrated in FIG. 17A, in each of the case where the reception unit 121b receives ultrasonic waves coming not through a recording material P and the case where the reception unit 121b receives ultrasonic waves coming through a recording material P, the peak detection unit 120d selects, as a peak detected signal, the peak value of the third waveform of each of the respective received signals.

Switching of amplification rates for the reception detection unit 123 and noise-to-signal ratios obtained as a result of switching of amplification rates are described.

In a case where the reception unit 121b receives ultrasonic waves coming not through a recording material P, the control unit 120 determines the amplitude of an output voltage in such a manner that the reception level Va3 of the received signal does not become saturated, as illustrated in FIG. 17A. In the fifth exemplary embodiment, the amplification rate to be used at this time is set to one time. Moreover, in the fifth exemplary embodiment, the amplification rate set to one time is also referred to as a "first amplification rate". Since, in a case where the reception unit 121b receives ultrasonic waves coming through a recording material P, ultrasonic waves are attenuated by the recording material P, the received signal becomes small and the detected signal also becomes small. Therefore, as illustrated in FIG. 17A, the control unit 120 determines the amplification rate in such a manner that the amplification rate of the received signal is larger than the amplification rate set for a case where the reception unit 121b receives ultrasonic waves coming not through a recording material P and the reception level Vp3 of the detected signal does not become saturated. In the fifth exemplary embodiment, the amplification rate to be used at this time is set to 20 times. Moreover, in the fifth exemplary embodiment, the amplification rate set to 20 times is also referred to as a "third amplification rate". However, at this time, when the received signal obtained in a case where the reception unit 121b receives ultrasonic waves coming through a recording material P is amplified, a noise signal (not illustrated) present in a circuit which receives ultrasonic waves may also be amplified. Therefore, a noise-to-signal ratio, which is the ratio of the noise signal to the received signal of ultrasonic waves, becomes larger.

Therefore, in the fifth exemplary embodiment, the peak detection unit 120d detects peak values of waveforms obtained at different timings between in a case where the reception unit 121*b* receives ultrasonic waves coming not through a recording material P and in a case where the reception unit 121*b* receives ultrasonic waves coming through a recording material P. In the following description, switching of peak detection waveforms in the fifth exemplary embodiment is described with reference to FIG. 17B.

In the example illustrated in FIG. 17B, in a case where the reception unit 121*b* receives ultrasonic waves coming not through a recording material P, for example, the peak detection unit 120*d* selects, as a peak detected signal, the peak value of the first waveform which is not saturated out of the received signal.

Moreover, in a case where the reception unit 121*b* receives ultrasonic waves coming through a recording material P, for example, the peak detection unit 120*d* selects, as a peak detected signal, the peak value of the third waveform of the received signal. Switching of amplification rates for the reception detection unit 123 and noise-to-signal ratios obtained as a result of switching of amplification rates are described.

In a case where the reception unit 121*b* receives ultrasonic waves coming not through a recording material P, the control unit 120 determines the amplitude of the output signal in such a manner that the reception level Va1 of the detected signal does not become saturated. In the fifth exemplary embodiment, in a case where the reception unit 121*b* receives ultrasonic waves coming not through a recording material P, the control unit 120 makes the amplitude of the output signal larger up to a level according to which the reception level Va1 of the first waveform of the received signal does not become saturated. In the fifth exemplary embodiment, the control unit 120 sets the drive voltage to 10 V and sets the amplification rate of the received signal at that time to one time. Moreover, in the fifth exemplary embodiment, the amplification rate set to one time is also referred to as a "first amplification rate". Furthermore, in the fifth exemplary embodiment, the reception level of the first waveform of the received signal is assumed to be a reception level smaller than the reception level of the third waveform, as illustrated in FIG. 17A with waveforms of the peak detected signal in a case where the reception unit 121*b* receives ultrasonic waves coming not through a recording material P. However, the magnitude relationship between reception levels does not necessarily need to be this relationship.

Next, in a case where the reception unit 121*b* receives ultrasonic waves coming through a recording material P, the control unit 120 determines the amplification rate of the received signal for a case where the reception unit 121*b* receives ultrasonic waves coming through a recording material P, in such a manner that the reception level Vp3 of the received signal does not become saturated. At this time, the control unit 120 changes a waveform with respect to which to detect the peak value of the reception level in a case where the reception unit 121*b* receives ultrasonic waves coming not through a recording material P to the third waveform. The control unit 120 sets the amplitude of the output signal large to such an extent that the reception level Va1 does not become saturated irrespective of the presence or absence of a recording material P. In the fifth exemplary embodiment, the control unit 120 sets the drive voltage to 10 V. Accordingly, the amplification rate of the received signal for a case where the reception unit 121*b* receives ultrasonic waves coming through a recording material P is able to be set to 10 times, which is smaller than in the case illustrated in FIG. 17A. Moreover, in the fifth exemplary embodiment, the amplification rate set to 10 times is also referred to as a "second amplification rate". In this way, in the case illustrated in FIG. 17B, since the amplification rate of the received signal can be set smaller than in the case illustrated in FIG. 17A, it is possible to prevent or reduce the nose-to-signal ratio from becoming larger than in the case illustrated in FIG. 17A.

Furthermore, the amplitude of the output signal is not limited to the voltage values described in the fifth exemplary embodiment as long as it is within a range in which the peak detected signal Va1 does not become saturated. Moreover, the amplification rate of the received signal is not limited to the amplification rates described in the fifth exemplary embodiment as long as it is within a range in which the peak detected signal Vp3 does not become saturated.

[Switching of Peak Detected Signals Depending on Presence or Absence of Recording Material P>

Figure 18:
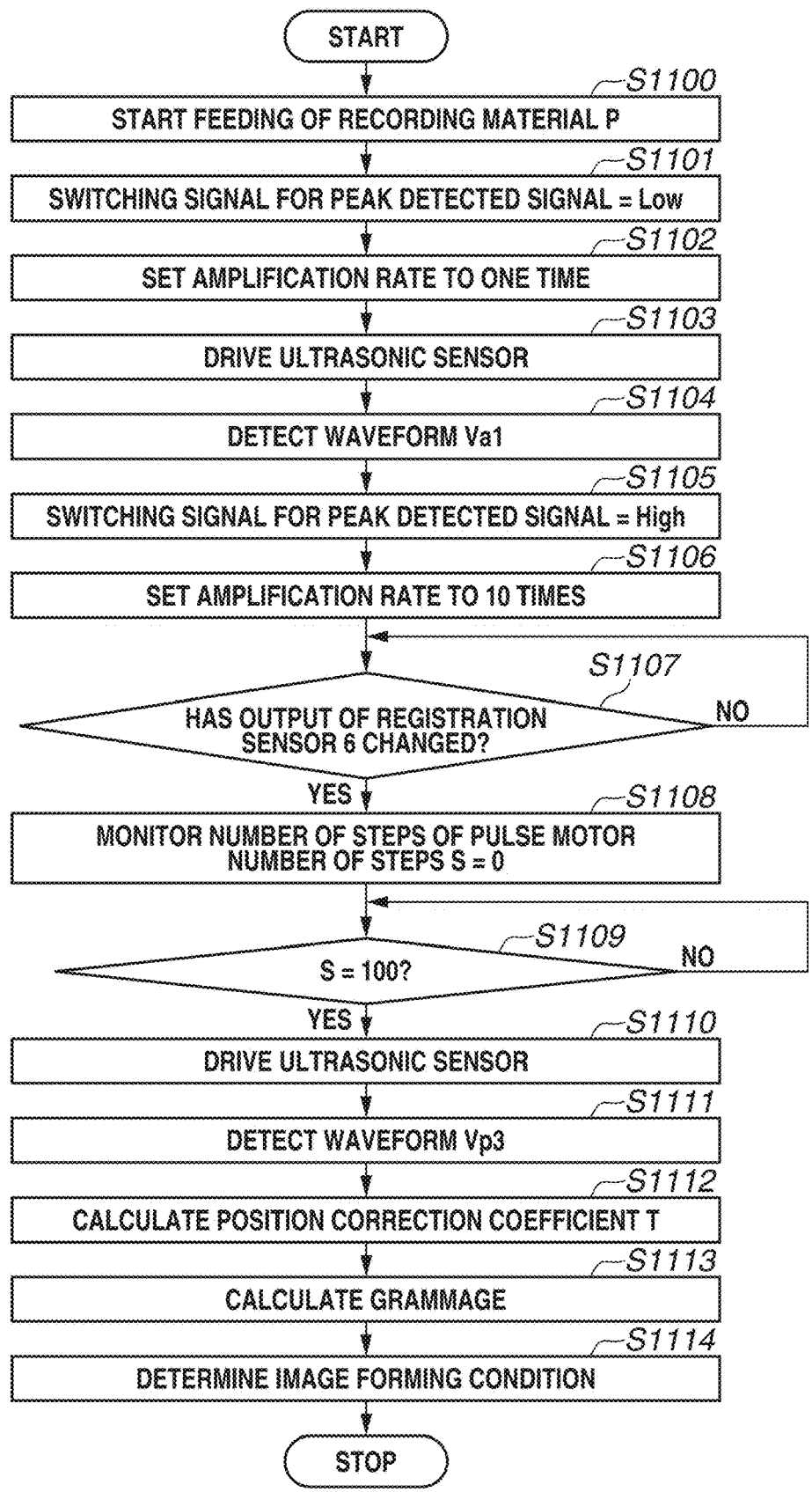
FIG. 18 is a flowchart of processing for calculating a detected value of the grammage of a recording material, which the recording material detection device performs according to the fifth exemplary embodiment.

In the following description, a method in which the peak detection unit 120*d* switches peak detected signals depending on the presence or absence of a recording material P to prevent or reduce a noise-to-signal ratio obtained in a case where the reception unit 121*b* receives ultrasonic waves coming through a recording material P from becoming large is described with reference to FIG. 18 and FIGS. 19A, 19B, 19C, 19D, 19E, 19F, and 19G. FIG. 18 is a flowchart of processing for calculating the grammage of a recording material P, and FIGS. 19A to 19G are timing diagrams illustrating, for example, states of signals and states of voltages concerning processing for calculating the grammage.

In step S1100, in response to receiving a printing instruction, the control unit 120 starts a paper feeding operation.

In step S1101, the control unit 120 outputs a low signal as a switching signal for the peak detected signal to be output by the peak detection unit 120*d*, as illustrated in FIG. 19B.

In step S1102, the emission instruction unit 120*a* included in the control unit 120 sets a drive voltage to be output by the emission circuit unit 122 to 10 V, as illustrated in FIG. 19D. Accordingly, the amplification rate switching instruction unit 120*b* sets the amplification rate of the received signal for the reception detection unit 123 to one time, as illustrated in FIG. 19C.

In step S1103, the control unit 120 performs the following processing at timing at which, after the start of the paper feeding operation, a recording material P has not yet arrived at the ultrasonic sensor 121. Thus, as illustrated in FIG. 19A, the control unit 120 starts measuring the reception level of ultrasonic waves via the reception unit 121*b* obtained in a case where the reception unit 121*b* receives ultrasonic waves coming not through a recording material P. The control unit 120 outputs a high signal as the drive signal from the emission instruction unit 120*a* to the emission circuit unit 122, as illustrated in FIG. 19E. In response to the drive signal output from the emission instruction unit 120*a*, the emission circuit unit 122 inputs a voltage of 10 V as the output signal to the USS terminal of the emission unit 121*a*, as illustrated in FIG. 19F. At this time, a burst signal of pulse waves with a voltage of 10 V is input from the emission circuit unit 122 to the USS terminal. Furthermore, in the fifth exemplary embodiment, with regard to the drive signal, for example, the frequency is set to 40 kHz, the number of pulses is set to two, and the period of the burst signal is set to 10 msec.

In step S1104, the control unit 120 detects the first waveform Va1 out of the detected signal and detects the peak value thereof. Detection of the peak value of the first waveform Va1 is described in the following.

The reception detection unit 123 receives, as an input, a received signal output from the reception unit 121b after the drive signal is input to the emission unit 121a. Then, the reception detection unit 123 starts detecting the received signal as a detected signal after a predetermined time T1 synchronized with the drive signal has elapsed. More specifically, the reception detection unit 123 starts detecting the detected signal when the detected signal exceeds a reference value (for example, being set to 0 V) after the predetermined time T1 synchronized with the drive signal has elapsed, and continues detecting the detected signal for a time until the detected signal returns to the reference value. In the fifth exemplary embodiment, the predetermined time T1 is assumed to be a time calculated from a relationship between a distance between the emission unit 121a and the reception unit 121b previously measured in the manufacturing process and a sound speed of ultrasonic waves previously detected by an ultrasonic sensor in the manufacturing process. Furthermore, the predetermined time T1 is also referred to as a "first time", and a time from when the control unit 120 starts detecting the detected signal to when the detected signal returns to the reference value is also referred to as a "second time". Moreover, a period from the first time to the second time is assumed to be a period for which waves with amplitudes lower than the first value, which is the maximum value of amplitudes of waves which the reception detection unit 123 is able to output, are output. In this way, the control unit 120 performs detection of the detected signal for a period after the predetermined time T1 elapses from inputting of a drive input to the emission unit 121a and until the second time elapses, thus calculating the reception level Va1. Furthermore, in the fifth exemplary embodiment, the first waveform Va1 is also referred to as a "first wave", and a value concerning an amplitude serving as the reception level Va1 is also referred to as "amplitude information about a first wave". At this time, the detected signal generated by the reception detection unit 123 has a waveform having a peak value at intervals of a half wavelength of 40 kHz, which is the same as the frequency of sound waves emitted from the emission unit 121a, according to a received signal of ultrasonic waves received by the reception unit 121b. Moreover, the number of waveforms of the received signal is a number exceeding two even if the number of pulses of the drive signal is two. This is because there is a reverberation in the emission unit 121a or the reception unit 121b.

In step S1105, the control unit 120 outputs a high signal as a switching signal for the peak detected signal to be output by the peak detection unit 120d, as illustrated in FIG. 19B.

In step S1106, the emission instruction unit 120a included in the control unit 120 sets a drive voltage to be output by the emission circuit unit 122 to 10 V, as illustrated in FIG. 19D. Accordingly, the amplification rate switching instruction unit 120b sets the amplification rate of the received signal for the reception detection unit 123 to 10 times, as illustrated in FIG. 19C.

In step S1107, the control unit 120 performs the following processing according to whether the front edge of a recording material P has arrived at the registration sensor 6. If it is determined that the front edge of a recording material P has arrived at the registration sensor 6 (YES in step S1107), the control unit 120 advances the processing to step S1108.

In step S1108, to detect timing at which the front edge of a recording material P arrives at the ultrasonic sensor 121 after arriving at the registration sensor 6, the control unit 120 starts counting of the number of steps S of a pulse motor (not illustrated).

In step S1109, the control unit 120 advances the processing to step S1110 according to whether the counted value of the number of steps S has reached a predetermined value (100). If it is determined that the counted value of the number of steps S has reached the predetermined value (100) (YES in step S1109), the control unit 120 advances the processing to step S1110.

In step S1110, the control unit 120 outputs a high signal as the drive signal from the emission instruction unit 120a to the emission circuit unit 122, as illustrated in FIG. 19E. The control unit 120 causes the emission circuit unit 122 to output the output signal to drive the ultrasonic sensor 121 and starts measurement of a reception level of the received signal performed by the reception detection unit 123 in a case where the reception unit 121b receives ultrasonic waves coming through a recording material P.

The emission circuit unit 122 inputs a voltage of 10 V to the USS terminal, as illustrated in FIG. 19F, according to the drive signal output from the emission instruction unit 120a.

In step S1111, the control unit 120 detects the third waveform Vp3 out of the detected signal and detects a peak value thereof. Detection of the peak value of the third waveform Vp3 is described in the following.

The reception detection unit 123 receives, as an input, a received signal output from the reception unit 121b after the drive signal is input to the emission unit 121a. Then, as with the detection of the detected waveform Va1 obtained in a case where the reception unit 121b receives ultrasonic waves coming not through a recording material P, the reception detection unit 123 starts detecting the received signal as a detected signal after a predetermined time T2 synchronized with the drive signal has elapsed. More specifically, the reception detection unit 123 starts detecting the detected signal when the detected signal exceeds a reference value (for example, being set to 0 V) after the predetermined time T2 synchronized with the drive signal has elapsed, and continues detecting the detected signal for a time until the detected signal returns to the reference value. In the fifth exemplary embodiment, the predetermined time T2 is assumed to be a time calculated from a relationship between a distance between the emission unit 121a and the reception unit 121b previously measured in the manufacturing process and a sound speed of ultrasonic waves previously detected by an ultrasonic sensor in the manufacturing process, and is assumed to be longer than the predetermined time T1.

Furthermore, the predetermined time T2 is also referred to as a "third time", and a time from when the control unit 120 starts detecting the detected signal to when the detected signal returns to the reference value is also referred to as a "fourth time". Moreover, a period from the third time to the fourth time is assumed to be a period for which waves with amplitudes lower than the first value, which is the maximum value of amplitudes of waves which the reception detection unit 123 is able to output, are output. In this way, the control unit 120 performs detection of the detected signal for a period after the predetermined time T2 elapses from inputting of a drive input to the emission unit 121a and until the fourth time elapses, thus calculating the reception level Vp3. Furthermore, in the fifth exemplary embodiment, the third waveform Vp3 is also referred to as a "second wave", and a value concerning an amplitude serving as the reception level Vp3 is also referred to as "amplitude information about a second wave".

In step S1112, the control unit 120 substitutes the reception levels Va1 and Vp3 for the above-mentioned equation (2), thus calculating the position correction coefficient T. In step S1113, the control unit 120 calculates the grammage of a recording material P with use of the calculated position correction coefficient T and the approximate expression previously stored in the storage unit. In step S1114, the control unit 120 determines an image forming condition according to the calculated grammage, and then ends the processing. Furthermore, in the fifth exemplary embodiment, the control unit 120 can calculate the grammage based on the position correction coefficient T or can change the image forming condition based on the position correction coefficient T. Moreover, in the fifth exemplary embodiment, the control unit 120 can discriminate a paper type based on the position correction coefficient T.

Furthermore, in the fifth exemplary embodiment, the drive voltage used for changing the amplitude of an output signal to be output from the emission circuit unit 122 is set to 10 V. However, the drive voltage is not limited to 10 V, but can be a voltage of higher than 10 V as long as it enables detecting a value which does not become saturated as a reception level of the detected signal in a case where the reception unit 121b receives ultrasonic waves coming not through a recording material P.

In this way, in the fifth exemplary embodiment, the peak detection unit 120d switches a waveform for use in detecting a peak value out of the received signal depending on the presence or absence of a recording material P. Thus, in a case where the reception unit 121b receives ultrasonic waves coming not through a recording material P, for example, the peak detection unit 120d selects, as a peak detected signal, a peak value of the first waveform of the received signal. Moreover, in a case where the reception unit 121b receives ultrasonic waves coming through a recording material P, for example, the peak detection unit 120d selects, as a peak detected signal, a peak value of the third waveform of the received signal. Accordingly, in a case where the reception unit 121b receives ultrasonic waves coming through a recording material P, it is possible to prevent or reduce the amplification rate of a received signal of ultrasonic waves from becoming large and, thus, it is possible to reduce an influence which a noise present in a circuit which receives ultrasonic waves exerts on a detection result of the grammage.

Furthermore, in the fifth exemplary embodiment, as a method in which the peak detection unit 120d switches a waveform for use in detecting a peak value out of the received signal depending on the presence or absence of a recording material P, a method of detecting a detected signal obtained for a predetermined time synchronized with the drive signal has been described. However, the method of switching a waveform for use in detecting a peak value is not limited to this. For example, the method of switching a waveform for use in detecting a peak value can include a method in which the reception level detection unit 120c detects waveforms of the detected signal with use of a digital signal obtained by converting the detected signal generated by the reception detection unit 123, thus counting the waveforms. At this time, the reception level detection unit 120c can count a point at which the digital signal of the detected signal becomes maximum and the waveform takes a peak value, or can count a point at which the digital signal of the detected signal becomes a value of 0 and the waveform intersects the horizontal axis.

Moreover, in the fifth exemplary embodiment, the method of switching a waveform for use in detecting a peak value can include the following method. For example, the method can include previously detecting a detected signal by an ultrasonic sensor in the manufacturing process, setting a threshold value Vth to a value in which the reception level of the detected signal does not become saturated, and detecting a time from when the drive input is input to the emission unit 121a to when the detected signal exceeds the threshold value Vth. In this case, the threshold value Vth is set to a value in which the reception level of the detected signal does not become saturated, i.e., a value smaller than the upper limit value of a signal available for detecting the received signal by the reception detection unit 123. Furthermore, the threshold value Vth is also referred to as a "second value". In a case where the reception unit 121b receives ultrasonic waves coming not through a recording material P, a time from when the drive input is input to the emission unit 121a to when the detected signal becomes a value larger than or equal to the threshold value Vth is denoted by Ta. Moreover, in a case where the reception unit 121b receives ultrasonic waves coming through a recording material P, a time from when the drive input is input to the emission unit 121a to when the detected signal becomes a value larger than or equal to the threshold value Vth is denoted by Tp. A method of detecting the grammage of a recording material P according to the thus-obtained times Ta and Tp can also be employed. Furthermore, the time Ta is also referred to as a "first period", and the time Tp is also referred to as a "second period".

In the fifth exemplary embodiment, as a method of preventing or reducing the amplification rate of a received signal of ultrasonic waves from becoming large, the following method has been described. The described method includes making the drive voltage for switching the amplitude of an output signal to be output from the emission circuit unit 122 constant with, for example, 10 V irrespective of the presence or absence of a recording material P and switching a waveform for detecting a peak value depending on the presence or absence of a recording material P. In a sixth exemplary embodiment, a method of switching the magnitude of the amplitude of an output signal depending on the presence or absence of a recording material P and switching a waveform for detecting a peak value is described. Furthermore, the same components as those in the fifth exemplary embodiment are assigned the respective same reference characters and are omitted from description here. Moreover, portions with the same reference numerals assigned are assumed to perform the respective same functions and operations.

First, in a case where the reception unit 121b receives ultrasonic waves coming through a recording material P, the method makes the amplitude of an output signal larger, thus preventing or reducing the amplification rate of the received signal from becoming large. This prevents or reduces a noise-to-signal ratio of the reception level Vp3 of a detected signal obtained in a case where the reception unit 121b receives ultrasonic waves coming through a recording material P from becoming large. In the following description, switching of a peak detection waveform in the sixth exemplary embodiment is described with reference to FIG. 20.

In the example illustrated in FIG. 20, as with the example illustrated in FIG. 17B, in a case where the reception unit 121b receives ultrasonic waves coming not through a recording material P, for example, the method selects, as a peak detected signal, the peak value of the first waveform of the received signal. Moreover, in a case where the reception unit 121b receives ultrasonic waves coming through a recording material P, for example, the method selects, as a peak detected signal, the peak value of the third waveform of the received signal. Switching of amplification rates for the reception detection unit 123 and noise-to-signal ratios obtained as a result of switching of amplification rates are described.

The case where the reception unit 121b receives ultrasonic waves coming not through a recording material P illustrated in FIG. 20 is similar in description to the example illustrated in FIG. 17B and is, therefore, omitted from description.

In a case where the reception unit 121b receives ultrasonic waves coming through a recording material P illustrated in FIG. 20, the method determines the amplitude and amplification rate of the output signal in such a manner that the reception level Vp3 of the detected signal does not become saturated. In the sixth exemplary embodiment, the method switches a drive voltage depending on the presence or absence of a recording material P by a drive input switching unit, and sets a drive voltage for a case where the reception unit 121b receives ultrasonic waves coming through a recording material P to, for example, 20 V. This enables lowering the amplification rate to five times as compared with the example illustrated in FIG. 17B. Since the amplification rate can be set smaller, it is possible to prevent or reduce the noise-to-signal ratio from becoming large, as compared with the example illustrated in FIG. 17B.

Furthermore, the amplitude of the output signal is not limited to the voltage values described in the sixth exemplary embodiment as long as it is within a range in which the peak detected signal Va1 does not become saturated. Moreover, the amplification rate of the received signal is not limited to the amplification rates described in the sixth exemplary embodiment as long as it is within a range in which the peak detected signal Vp3 does not become saturated.

[Switching of Output Signals and Peak Detected Signals Depending on Presence or Absence of Recording Material P>

Figure 21:
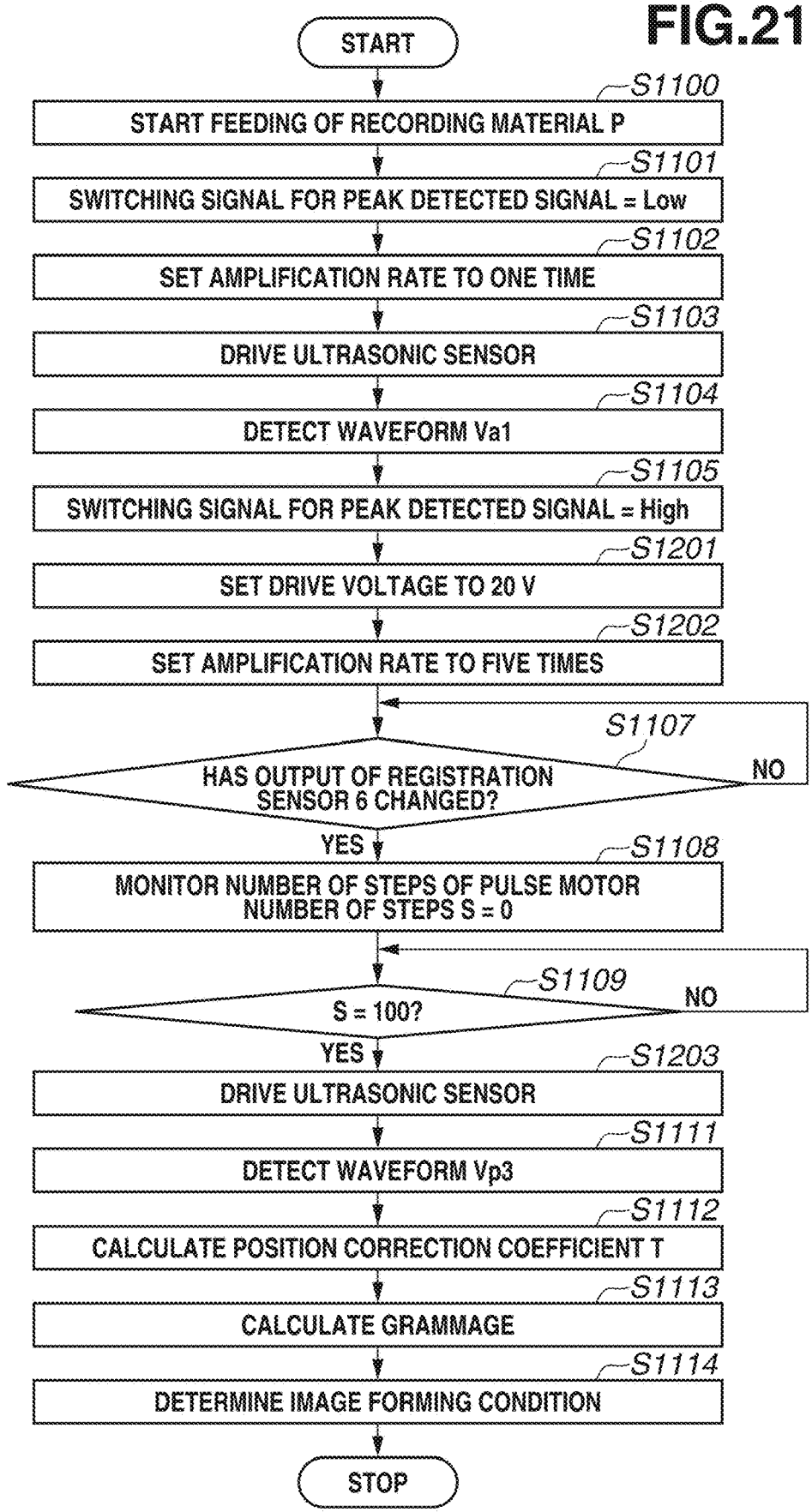
FIG. 21 is a flowchart of processing for calculating a detected value of the grammage of a recording material, which the recording material detection device performs according to the sixth exemplary embodiment.

In the following description, a method in which the peak detection unit 120d switches peak detected signals depending on the presence or absence of a recording material P to prevent or reduce a noise-to-signal ratio of the reception level Vp obtained in a case where the reception unit 121b receives ultrasonic waves coming through a recording material P from becoming large is described. FIG. 21 is a flowchart of processing for calculating the grammage of a recording material P, and FIGS. 22A, 22B, 22C, 22D, 22E, 22F, and 22G are timing diagrams illustrating, for example, states of signals and states of voltages concerning processing for calculating the grammage. The same components as those illustrated in FIG. 18 and FIGS. 19A to 19G are assigned the respective same reference characters and are omitted from description here. Portions with the same reference characters assigned perform the respective same functions and operations and are, therefore, omitted from description.

In step S1100, in response to receiving a printing instruction, the control unit 120 starts a paper feeding operation. In step S1101, the control unit 120 outputs a low signal as a switching signal for the peak detected signal to be output by the peak detection unit 120d, as illustrated in FIG. 22B.

In step S1102, the emission instruction unit 120a included in the control unit 120 sets a drive voltage to be output by the emission circuit unit 122 to 10 V, as illustrated in FIG. 22D. Accordingly, the amplification rate switching instruction unit 120b sets the amplification rate of the received signal for the reception detection unit 123 to one time, as illustrated in FIG. 22C.

In step S1103, the control unit 120 performs the following processing at timing at which, after the start of the paper feeding operation, a recording material P has not yet arrived at the ultrasonic sensor 121. Thus, as illustrated in FIG. 22A, the control unit 120 starts measuring the reception level of ultrasonic waves via the reception unit 121b obtained in a case where the reception unit 121b receives ultrasonic waves coming not through a recording material P. The control unit 120 outputs a high signal as the drive signal from the emission instruction unit 120a to the emission circuit unit 122, as illustrated in FIG. 22E. In response to the drive signal output from the emission instruction unit 120a, the emission circuit unit 122 inputs a voltage of 10 V as the output signal to the USS terminal of the emission unit 121a, as illustrated in FIG. 22F. At this time, a burst signal of pulse waves with a voltage of 10 V is input from the emission circuit unit 122 to the USS terminal. Furthermore, in the sixth exemplary embodiment, with regard to the drive signal, for example, the frequency is set to 40 kHz, the number of pulses is set to two, and the period of the burst signal is set to 10 msec.

In step S1104, the control unit 120 detects the first waveform Va1 out of the detected signal and detects the peak value thereof. Detection of the peak value of the first waveform Va1 is described in the following.

The reception detection unit 123 receives, as an input, a received signal output from the reception unit 121b after the drive signal is input to the emission unit 121a. Then, the reception detection unit 123 starts detecting the received signal as a detected signal after a predetermined time T1 synchronized with the drive signal has elapsed. More specifically, the reception detection unit 123 starts detecting the detected signal when the detected signal exceeds a reference value (for example, being set to 0 V) after the predetermined time T1 synchronized with the drive signal has elapsed, and continues detecting the detected signal for a time until the detected signal returns to the reference value. In the sixth exemplary embodiment, the predetermined time T1 is assumed to be a time calculated from a relationship between a distance between the emission unit 121a and the reception unit 121b previously measured in the manufacturing process and a sound speed of ultrasonic waves previously detected by an ultrasonic sensor in the manufacturing process. Furthermore, the predetermined time T1 is also referred to as a "first time", and a time from when the control unit 120 starts detecting the detected signal to when the detected signal returns to the reference value is also referred to as a "second time". Moreover, a period from the first time to the second time is assumed to be a period for which waves with amplitudes lower than the first value, which is the maximum value of amplitudes of waves which the reception detection unit 123 is able to output, are output. In this way, the control unit 120 performs detection of the detected signal for a period after the predetermined time T1 elapses from inputting of a drive input to the emission unit 121a and until the second time elapses, thus calculating the reception level Va1. Furthermore, in the sixth exemplary embodiment, the first waveform Va1 is also referred to as a "first wave", and a value concerning an amplitude serving as the reception level Va1 is also referred to as "amplitude information about a first wave".

In step S1105, the control unit 120 outputs a high signal as a switching signal for the peak detected signal to be output by the peak detection unit 120d, as illustrated in FIG. 22B.

In step S1201, the emission instruction unit 120a included in the control unit 120 sets a drive voltage to be output by the emission circuit unit 122 to 20 V, as illustrated in FIG. 22D. Accordingly, in step S1202, the amplification rate switching instruction unit 120b sets the amplification rate of the received signal for the reception detection unit 123 to five times, as illustrated in FIG. 22C.

In step S1107, the control unit 120 performs the following processing according to whether the front edge of a recording material P has arrived at the registration sensor 6. If it is determined that the front edge of a recording material P has arrived at the registration sensor 6 (YES in step S1107), the control unit 120 advances the processing to step S1108.

In step S1108, to detect timing at which the front edge of a recording material P arrives at the ultrasonic sensor 121 after arriving at the registration sensor 6, the control unit 120 starts counting of the number of steps S of a pulse motor (not illustrated).

In step S1109, the control unit 120 advances the processing to step S1203 according to whether the counted value of the number of steps S has reached a predetermined value (100). If it is determined that the counted value of the number of steps S has reached the predetermined value (100) (YES in step S1109), the control unit 120 advances the processing to step S1203.

In step S1203, the control unit 120 outputs a high signal as the drive signal from the emission instruction unit 120a to the emission circuit unit 122, as illustrated in FIG. 22E. The control unit 120 causes the emission circuit unit 122 to output the output signal to drive the ultrasonic sensor 121 and starts measurement of a reception level of the received signal performed by the reception detection unit 123 in a case where the reception unit 121b receives ultrasonic waves coming through a recording material P.

At this time, the emission circuit unit 122 inputs a voltage of 20 V to the USS terminal of the emission unit 121a, as illustrated in FIG. 22F, according to the drive signal output from the emission instruction unit 120a.

In step S1111, the control unit 120 detects the third waveform Vp3 out of the detected signal and detects a peak value thereof. Detection of the peak value of the third waveform Vp3 is described in the following.

The reception detection unit 123 receives, as an input, a received signal output from the reception unit 121b after the drive signal is input to the emission unit 121a. Then, as with the detection of the detected waveform Va1 obtained in a case where the reception unit 121b receives ultrasonic waves coming not through a recording material P, the reception detection unit 123 starts detecting the received signal as a detected signal after a predetermined time T2 synchronized with the drive signal has elapsed. More specifically, the reception detection unit 123 starts detecting the detected signal when the detected signal exceeds a reference value (for example, being set to 0 V) after the predetermined time T2 synchronized with the drive signal has elapsed, and continues detecting the detected signal for a time until the detected signal returns to the reference value. In the sixth exemplary embodiment, the predetermined time T2 is assumed to be a time calculated from a relationship between a distance between the emission unit 121a and the reception unit 121b previously measured in the manufacturing process and a sound speed of ultrasonic waves previously detected by an ultrasonic sensor in the manufacturing process, and is assumed to be longer than the predetermined time T1.

Furthermore, the predetermined time T2 is also referred to as a "third time", and a time from when the control unit 120 starts detecting the detected signal to when the detected signal returns to the reference value is also referred to as a "fourth time". Moreover, a period from the third time to the fourth time is assumed to be a period for which waves with amplitudes lower than the first value, which is the maximum value of amplitudes of waves which the reception detection unit 123 is able to output, are output. In this way, the control unit 120 performs detection of the detected signal for a period after the predetermined time T2 elapses from inputting of a drive input to the emission unit 121a and until the fourth time elapses, thus calculating the reception level Vp3. Furthermore, in the sixth exemplary embodiment, the third waveform Vp3 is also referred to as a "second wave", and a value concerning an amplitude serving as the reception level Vp3 is also referred to as "amplitude information about a second wave".

In step S1112, the control unit 120 substitutes the reception levels Va1 and Vp3 for the above-mentioned equation (2), thus calculating the position correction coefficient T. The subsequent processing operations are the same as those illustrated in FIG. 18 and are, therefore, omitted from description.

Figure 23:
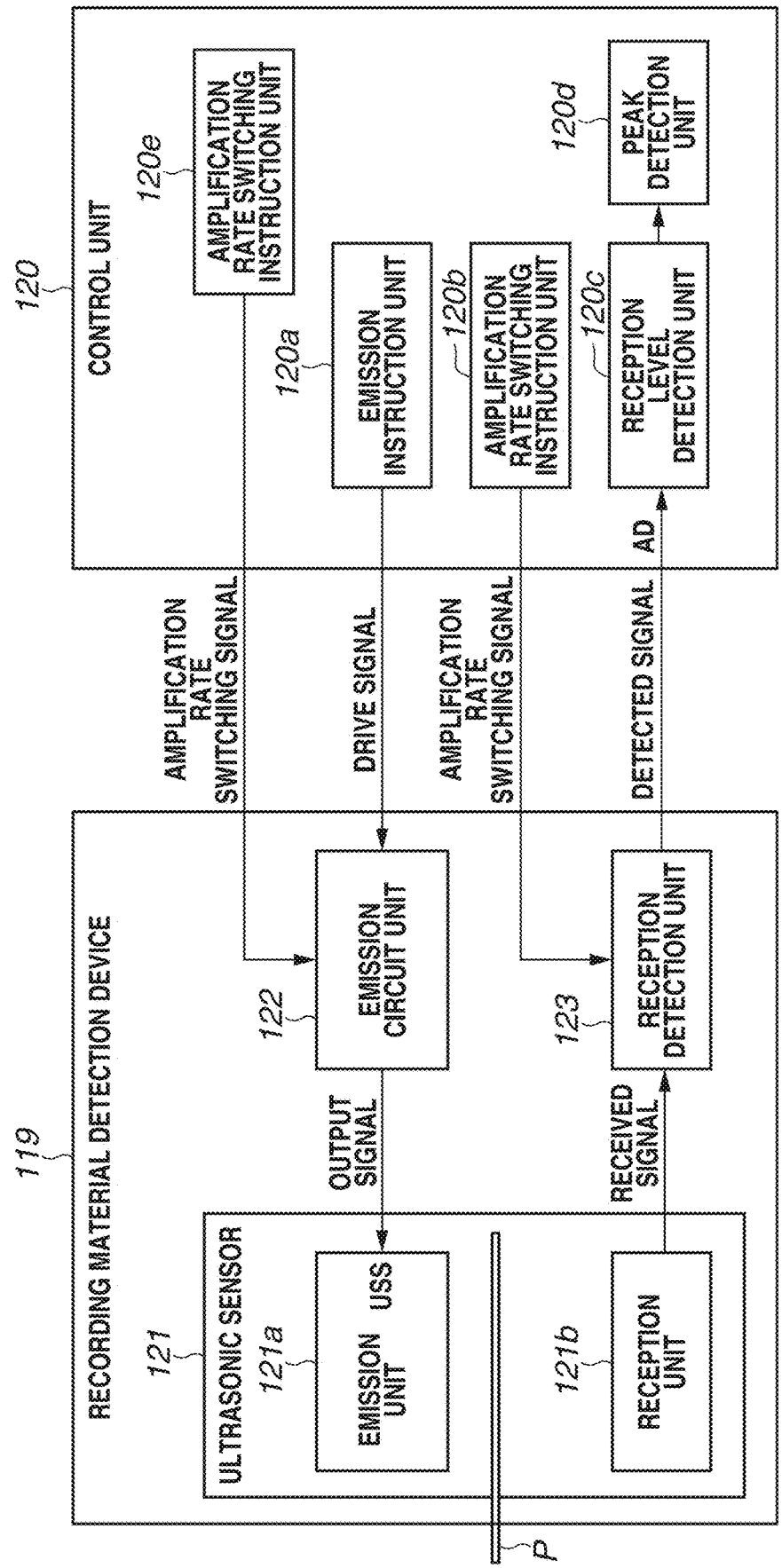
FIG. 23 is an outline configuration diagram of a recording material detection device according to a modification example of the sixth exemplary embodiment.

Furthermore, in the sixth exemplary embodiment, a method of switching the drive voltage is used to switch the magnitude of the amplitude of an output signal depending on the presence or absence of a recording material P. However, as illustrated in FIG. 23, the control unit 120 can be configured to further include an amplification rate switching instruction unit 120e, which controls the amplification rate of a voltage input to the emission circuit unit 122, and perform the following control. Thus, the control unit 120 can be configured to set the drive voltage constant irrespective of the presence or absence of a recording material P and switch an amplification rate switching signal output from the amplification rate switching instruction unit 120e depending on the presence or absence of a recording material P, thus switching the amplification rate of a voltage input to the emission circuit unit 122. In this case, for example, the control unit 120 sets the drive voltage to 20 V irrespective of the presence or absence of a recording material P, and sets the amplification rate to ½ times in a case where the reception unit 121b receives ultrasonic waves coming not through a recording material P. Moreover, the control unit 120 sets the amplification rate to one time in a case where the reception unit 121b receives ultrasonic waves coming through a recording material P.

In this way, in the sixth exemplary embodiment, the control unit 120 switches the magnitude of the amplitude of an output signal depending on the presence or absence of a recording material P, and the peak detection unit 120d switches a waveform for use in detecting a peak value out of the received signal depending on the presence or absence of a recording material P. Thus, in a case where the reception unit 121b receives ultrasonic waves coming not through a recording material P, for example, the peak detection unit 120d selects, as a peak detected signal, a peak value of the first waveform of the received signal. Moreover, in a case where the reception unit 121b receives ultrasonic waves coming through a recording material P, for example, the control unit 120 makes the amplitude of the output signal larger than in a case where the reception unit 121b receives ultrasonic waves coming not through a recording material P. Then, the peak detection unit 120d selects, as a peak detected signal, a peak value of the third waveform of the received signal. Accordingly, in a case where the reception unit 121b receives ultrasonic waves coming through a recording material P, it is possible to prevent or reduce the amplification rate of a received signal of ultrasonic waves from becoming large and, thus, it is possible to reduce an influence which a noise present in a circuit which receives ultrasonic waves exerts on a detection result of the grammage.

Furthermore, in the sixth exemplary embodiment, as a method in which the peak detection unit 120d switches a waveform for use in detecting a peak value out of the received signal depending on the presence or absence of a recording material P, a method of detecting a detected signal obtained for a predetermined time synchronized with the drive signal has been described. However, the method of switching a waveform for use in detecting a peak value is not limited to this. For example, the method of switching a waveform for use in detecting a peak value can include a method in which the reception level detection unit 120c detects waveforms of the detected signal with use of a digital signal obtained by converting the detected signal generated by the reception detection unit 123, thus counting the waveforms. At this time, the reception level detection unit 120c can count a point at which the digital signal of the detected signal becomes maximum and the waveform takes a peak value, or can count a point at which the digital signal of the detected signal becomes a value of 0 and the waveform intersects the horizontal axis.

Moreover, in the sixth exemplary embodiment, the method of switching a waveform for use in detecting a peak value can include the following method. For example, the method can include previously detecting a detected signal by an ultrasonic sensor in the manufacturing process, setting a threshold value Vth to a value in which the reception level of the detected signal does not become saturated, and detecting a time from when the drive input is input to the emission unit 121a to when the detected signal exceeds the threshold value Vth. In this case, the threshold value Vth is set to a value in which the reception level of the detected signal does not become saturated, i.e., a value smaller than the upper limit value of a signal available for detecting the received signal by the reception detection unit 123.

In a case where the reception unit 121b receives ultrasonic waves coming not through a recording material P, a time from when the drive input is input to the emission unit 121a to when the detected signal becomes a value larger than or equal to the threshold value Vth is denoted by Ta. Moreover, in a case where the reception unit 121b receives ultrasonic waves coming through a recording material P, a time from when the drive input is input to the emission unit 121a to when the detected signal becomes a value larger than or equal to the threshold value Vth is denoted by Tp. A method of detecting the grammage of a recording material P according to the thus-obtained times Ta and Tp can also be employed. Furthermore, the time Ta is also referred to as a "first period", and the time Tp is also referred to as a "second period".

In the case of using such a method, to switch the magnitude of the amplitude of an output signal depending on the presence or absence of a recording material P, a configuration in which the drive voltage is made constant irrespective of the presence or absence of a recording material P and the frequency of a drive signal to be output from the emission instruction unit 120a is switched depending on the presence or absence of a recording material P can be employed. For example, the frequency of a drive signal according to which the amplitude of ultrasonic waves becomes maximum is assumed to be a first frequency, and the frequency of a drive signal according to which the amplitude of ultrasonic waves becomes smaller than the amplitude of ultrasonic waves obtained when the drive signal has the first frequency is assumed to be a second frequency. In this case, when the reception unit 121b receives ultrasonic waves coming through a recording material P, the emission instruction unit 120a outputs pulse waves having the first frequency as the drive signal. Moreover, when the reception unit 121b receives ultrasonic waves coming not through a recording material P, the emission instruction unit 120a outputs pulse waves having the second frequency as the drive signal. This enables the emission unit 121a to output ultrasonic waves larger in amplitude in a case where the reception unit 121b receives ultrasonic waves coming through a recording material P than in a case where the reception unit 121b receives ultrasonic waves coming not through a recording material P. Accordingly, it is possible to prevent or reduce the noise-to-signal ratio from becoming large due to the received signal being amplified in a case where the reception unit 121b receives ultrasonic waves coming through a recording material P. Therefore, it becomes possible to perform detection of the grammage of a recording material P with a higher degree of accuracy than in the conventional method.

Moreover, a configuration in which the drive voltage and the frequency of a drive signal to be output from the emission instruction unit 120a are made constant irrespective of the presence or absence of a recording material P and a duty ratio between a high signal and a low signal in the drive signal is switched depending on the presence or absence of a recording material P can be employed. This enables the emission unit 121a to output ultrasonic waves larger in amplitude in a case where the reception unit 121b receives ultrasonic waves coming through a recording material P than in a case where the reception unit 121b receives ultrasonic waves coming not through a recording material P. Accordingly, it is possible to prevent or reduce the noise-to-signal ratio from becoming large due to the received signal being amplified in a case where the reception unit 121b receives ultrasonic waves coming through a recording material P.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™, a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-210444 filed Dec. 18, 2020 and No. 2020-210445 filed Dec. 18, 2020, which are hereby incorporated by reference herein in their entirety.

What is claimed is:

1. A device comprising:
   a sensor including an emission unit which emits ultrasonic waves and a reception unit which receives the ultrasonic waves, the emission unit and the reception unit being arranged opposite each other across a conveyance path through which a recording material is conveyed;
   an instruction unit configured to input, to the emission unit, a first drive input for causing the emission unit to emit ultrasonic waves with a first maximum amplitude and a second drive input for causing the emission unit to emit ultrasonic waves with a second maximum amplitude larger than the first maximum amplitude; and
   a detection unit configured to detect information about a grammage of the recording material based on a first value obtained by the reception unit receiving ultrasonic waves emitted from the emission unit with the first drive input supplied thereto and coming not through the recording material and a second value obtained by the reception unit receiving ultrasonic waves emitted from the emission unit with the second drive input supplied thereto and coming through the recording material.

2. The device according to claim 1, wherein the instruction unit includes a first output circuit unit, which is connected to a first terminal of the emission unit, and a second output circuit unit, which is connected to a second terminal of the emission unit.

3. The device according to claim 2,
   wherein the instruction unit further includes a third output circuit unit, which is connected to the second terminal of the emission unit, and
   wherein the device further comprises a first switching unit configured to switch between connecting the second output circuit unit to the second terminal of the emission unit and connecting the third output circuit unit to the second terminal of the emission unit.

4. The device according to claim 3, wherein, in a case where the first drive input is input from the instruction unit to the emission unit,
   the first switching unit connects the third output circuit unit to the second terminal, and
   the instruction unit switches between a first state of outputting the first drive input from the first output circuit unit and outputting an input corresponding to ground from the third output circuit unit and a second state of outputting an input corresponding to ground from the first output circuit unit and outputting an input corresponding to ground from the third output circuit unit.

5. The device according to claim 3, wherein, in a case where the second drive input is input from the instruction unit to the emission unit,
   the first switching unit connects the second output circuit unit to the second terminal, and
   the instruction unit switches between a third state of outputting the second drive input from the first output circuit unit and outputting an input corresponding to ground from the second output circuit unit and a fourth state of outputting an input corresponding to ground from the first output circuit unit and outputting the second drive input from the second output circuit unit.

6. The device according to claim 2, further comprising:
   a fourth output circuit unit, which is connected to the second output circuit unit and is configured to output a drive signal to the second output circuit unit;
   a fifth output circuit unit, which is connected to the second output circuit unit and is configured to output an input corresponding to ground to the second output circuit unit; and
   a second switching unit configured to switch between connecting the fourth output circuit unit to the second output circuit unit and connecting the fifth output circuit unit to the second output circuit unit.

7. The device according to claim 6, wherein, in a case where the first drive input is supplied from the instruction unit to the emission unit,
   the second switching unit connects the fifth output circuit unit to the second output circuit unit, and
   the instruction unit switches between a first state of outputting the first drive input from the first output circuit unit and outputting an input corresponding to ground from the second output circuit unit and a second state of outputting an input corresponding to ground from the first output circuit unit and outputting an input corresponding to ground from the second output circuit unit.

8. The device according to claim 6, wherein, in a case where the second drive input is supplied from the instruction unit to the emission unit,
   the second switching unit connects the fourth output circuit unit to the second output circuit unit, and
   the instruction unit switches between a first state of outputting the second drive input from the first output circuit unit and outputting an input corresponding to ground from the second output circuit unit and an second state of outputting an input corresponding to ground from the first output circuit unit and outputting the second drive input from the second output circuit unit.

9. The device according to claim 2, wherein, in a case where the first drive input is supplied from the instruction unit to the emission unit,
   the instruction unit switches between a first state of outputting the first drive input from the first output circuit unit and outputting an input corresponding to ground from the second output circuit unit and a second state of outputting an input corresponding to ground from the first output circuit unit and outputting the first drive input from the second output circuit unit.

10. The device according to claim 2, wherein, in a case where the second drive input is supplied from the instruction unit to the emission unit,
    the instruction unit switches between a first state of outputting the second drive input from the first output circuit unit and outputting an input corresponding to ground from the second output circuit unit and a second state of outputting an input corresponding to ground from the first output circuit unit and outputting the second drive input from the second output circuit unit.

11. The device according to claim 2, wherein, in a case where the first drive input is supplied from the instruction unit to the emission unit, the instruction unit switches between a first state of outputting the first drive input from the first output circuit unit and outputting an input corresponding to ground from the second output circuit unit and a second state of outputting an input corresponding to ground from the first output circuit unit and outputting an input corresponding to ground from the second output circuit unit.

12. The device according to claim 2, wherein, in a case where the second drive input is supplied from the instruction unit to the emission unit, the instruction unit switches between a first state of outputting the second drive input from the first output circuit unit and outputting an input corresponding to ground from the second output circuit unit and a second state of outputting an input corresponding to ground from the first output circuit unit and outputting an input corresponding to ground from the second output circuit unit.

13. An apparatus comprising:

a forming unit configured to form an image on a recording material; and the device according to claim 1, wherein the image forming unit forms an image based on a detection result obtained by the device performing detection.

* * * * *